(12) United States Patent
Filias et al.

(10) Patent No.: US 7,791,529 B2
(45) Date of Patent: Sep. 7, 2010

(54) SYSTEM FOR ESTIMATING THE SPEED OF AN AIRCRAFT, AND AN APPLICATION THEREOF TO DETECTING OBSTACLES

(75) Inventors: François Xavier Filias, Lambesc (FR); Jean-Paul Petillon, Miramas (FR); Richard Pire, Istres (FR)

(73) Assignee: Eurocopter, Marignane (FR)

( * ) Notice: Subject to any disclaimer, the term of this patent is extended or adjusted under 35 U.S.C. 154(b) by 400 days.

(21) Appl. No.: 11/435,775

(22) Filed: May 18, 2006

(65) Prior Publication Data
US 2007/0075893 A1 Apr. 5, 2007

(30) Foreign Application Priority Data
May 19, 2005 (FR) .................................. 05 05047

(51) Int. Cl.
| | |
|---|---|
| G01S 13/58 | (2006.01) |
| G01S 13/93 | (2006.01) |
| G01S 15/58 | (2006.01) |
| G01S 15/93 | (2006.01) |
| G01S 17/58 | (2006.01) |
| G01S 17/93 | (2006.01) |
| G01S 13/00 | (2006.01) |
| G01S 15/00 | (2006.01) |
| G01S 17/00 | (2006.01) |

(52) U.S. Cl. .......................... 342/115; 342/27; 342/28; 342/61; 342/62; 342/63; 342/64; 342/65; 342/104; 342/105; 342/118; 342/120; 342/175; 342/176; 342/179; 342/195; 367/89; 367/90; 367/91; 367/93; 367/94; 382/100; 382/107; 701/1; 701/3; 701/4; 701/7

(58) Field of Classification Search ................. 382/100, 382/103, 104, 106, 107; 342/25 R–25 F, 342/52–66, 104–123, 175, 176, 179, 189–197, 342/27, 28; 356/27, 28, 29; 348/699; 701/1–28; 367/87, 89, 90, 91, 93, 94, 117
See application file for complete search history.

(56) References Cited

U.S. PATENT DOCUMENTS

| | | | | |
|---|---|---|---|---|
| 3,702,477 | A | | 11/1972 | Brown |
| 4,985,765 | A | * | 1/1991 | Fernando ..................... 348/699 |
| 5,045,855 | A | * | 9/1991 | Moreira .................... 342/25 A |

(Continued)

FOREIGN PATENT DOCUMENTS

EP 0436213 A 7/1991

(Continued)

OTHER PUBLICATIONS

French Preliminary Search Report; French National Registration Nos. FA665477 and FR050504; dated Mar. 22, 2006; by D. Reto.

*Primary Examiner*—Bernarr E Gregory
(74) *Attorney, Agent, or Firm*—Young & Thompson

(57) ABSTRACT

The invention relates to a method of determining an estimated speed of an aircraft relative to ground being overflown by the aircraft, in which use is made of the sum of an acceleration measurement of the aircraft plus a difference value, the difference value being obtained from observation data or signals relating to a region of the ground.

25 Claims, 9 Drawing Sheets

U.S. PATENT DOCUMENTS

| | | | | |
|---|---|---|---|---|
| 5,063,524 A | * | 11/1991 | Ferre et al. | 382/107 |
| 5,067,014 A | * | 11/1991 | Bergen et al. | 382/107 |
| 5,128,874 A | | 7/1992 | Bhanu et al. | |
| 5,166,688 A | * | 11/1992 | Moreira | 342/25 A |
| 5,241,608 A | * | 8/1993 | Fogel | 382/107 |
| 5,247,586 A | * | 9/1993 | Gobert et al. | 382/107 |
| 5,249,238 A | * | 9/1993 | Komerath et al. | 382/107 |
| 5,257,209 A | * | 10/1993 | Markandey | 382/107 |
| 5,265,172 A | * | 11/1993 | Markandey et al. | 382/107 |
| 5,682,438 A | * | 10/1997 | Kojima et al. | 382/107 |
| 5,742,699 A | * | 4/1998 | Adkins et al. | 382/107 |
| 5,771,485 A | * | 6/1998 | Echigo | 701/119 |
| 5,870,053 A | * | 2/1999 | Chamouard et al. | 342/25 A |
| 5,945,937 A | * | 8/1999 | Fujimura | 342/25 C |
| 5,991,428 A | * | 11/1999 | Taniguchi | 382/107 |
| 6,163,620 A | * | 12/2000 | Hojnacki et al. | 382/107 |
| 6,628,804 B1 | * | 9/2003 | Edanami | 382/107 |
| 6,697,501 B2 | * | 2/2004 | Tevs et al. | 382/107 |
| 6,952,178 B2 | * | 10/2005 | Kirscht | 342/25 B |
| 2004/0267444 A1 | | 12/2004 | Coatantiec et al. | |

FOREIGN PATENT DOCUMENTS

| WO | WO94/20927 | * | 9/1994 |
|---|---|---|---|
| WO | 02/46699 A | | 6/2002 |

* cited by examiner

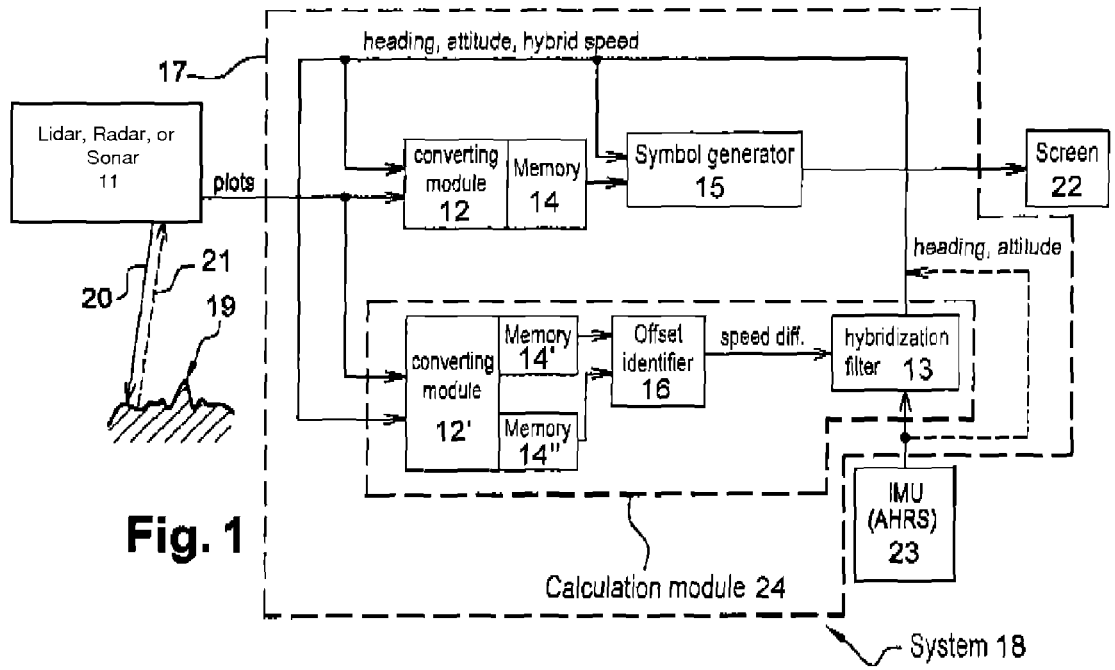
Fig. 1
Fig. 2
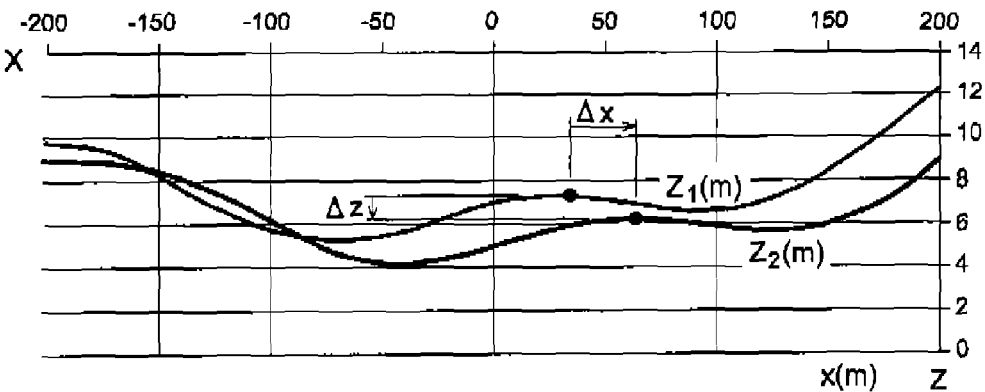
Fig. 3

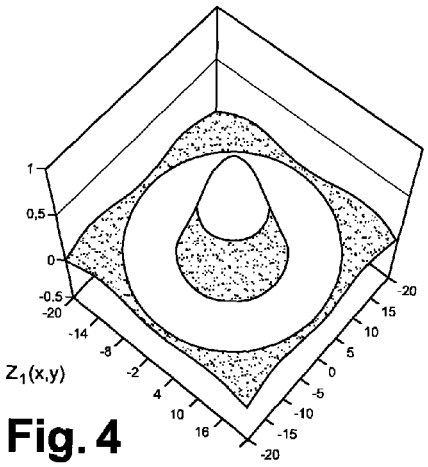
Fig. 4  $Z_1(x,y)$
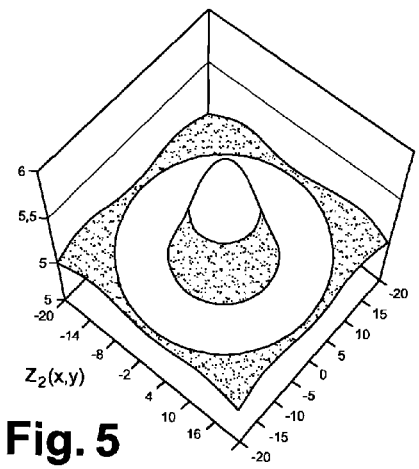
Fig. 5  $Z_2(x,y)$
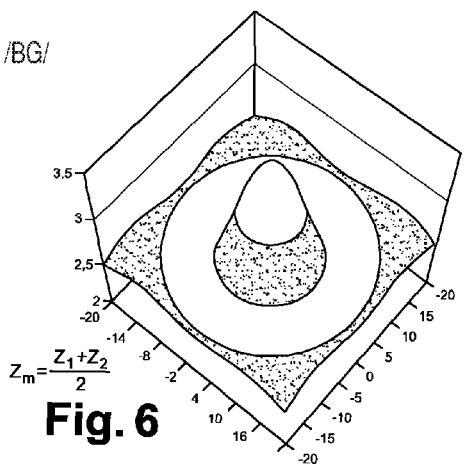
Fig. 6  $Z_m = \frac{Z_1 + Z_2}{2}$
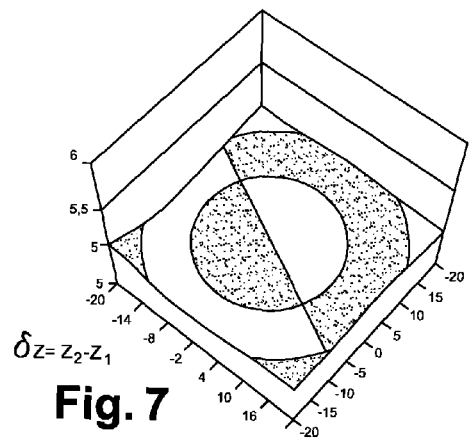
Fig. 7  $\delta z = Z_2 - Z_1$
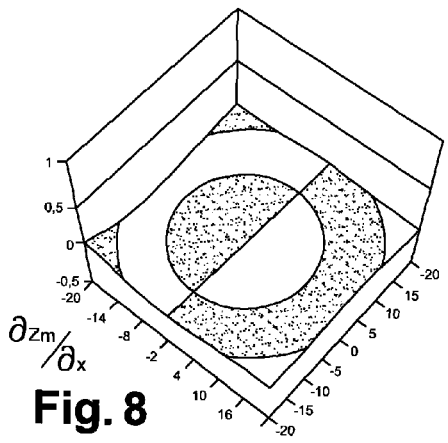
Fig. 8  $\partial Z_m / \partial x$
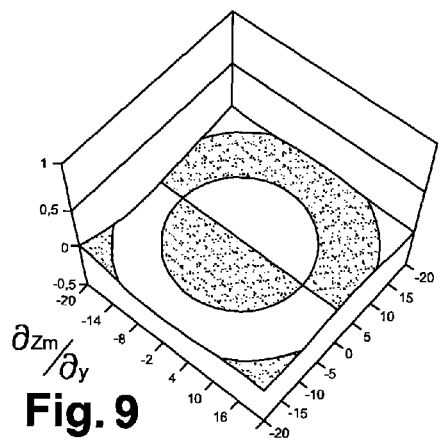
Fig. 9  $\partial Z_m / \partial y$

SYSTEM FOR ESTIMATING THE SPEED OF AN AIRCRAFT, AND AN APPLICATION THEREOF TO DETECTING OBSTACLES

The present invention relates to a method and to a device for estimating the speed of an aircraft, and also to a system on board an aircraft for detecting obstacles.

FIELD OF THE INVENTION

The technical field of the invention is that of fabricating and using obstacle warning systems (OWS) on board vehicles.

The present invention relates more particularly to a self-contained system for detecting obstacles, the system being on board a rotary wing aircraft and incorporating a sensor for observing the ground being overflown by the aircraft, e.g. a scanning range finder.

BACKGROUND OF THE INVENTION

U.S. Pat. No. 5,128,874 describes a system for detecting obstacles that combines an active sensor (radar) and passive sensors (cameras); the images delivered by the passive sensors are analyzed and points of interest (points of projecting relief) are extracted therefrom; for the points of interest in two successive images, the effect of rotation of the aircraft (heading, roll, pitch) during the time interval between taking the images is compensated with the help of signals delivered by an inertial navigation unit; the pairing of points of interest that are common to both images and calculating a focus of expansion corresponding to the instantaneous direction of displacement of the aircraft are then performed; the distance between the aircraft and the item corresponding to paired points of interest is calculated as a function in particular of the speed in translation of the aircraft as delivered by the inertial navigation unit; the system described in that patent is complex; in addition, the accuracy of the system is the subject of drift in the speed estimation made by the inertial unit on the basis of an acceleration measurement; furthermore, the active sensor (millimeter radar or laser) is used for detecting the presence of small obstacles ahead of the helicopter; for this purpose, the sensor performs a circular scan in order to keep the duration of acquisition down to a value that is small enough.

The time required to construct a lidar or radar image by scanning-increases in proportion to the resolution of the image (number of pixels) and with the range of the sensor. Constructing an image of 100,000 points with a laser having a range of 1500 meters (m) requires about 1 second.

During that time, the vehicle carrying the obstacle detection system can travel through a distance that is not negligible (typically of the order of 70 m for a helicopter) which has the effect of distorting the resulting image.

To compensate for such distortion, a known technique consists in using information coming from a positioning system such as a global positioning system (GPS) installed on board the carrier vehicle; this information is optionally hybridized with positioning data delivered by an inertial unit in order to individually "update" each of the measurements and construct an image that matches reality. By performing GPS and inertial unit hybridization, precision is achieved in estimating the speed of the carrier vehicle that is of the order of one centimeter per second, thus enabling very fine details to be extracted from the image; it is also necessary to be able to determine the speed of the carrier relative to the ground with sufficient accuracy in order to be able to construct a set of symbols to provide assistance in avoiding obstacles.

A drawback of that technique is that the availability and the integrity of the obstacle detection function rely on "a series connection" (in the breakdown sense), of: i) the sensor for observing the ground; ii) the system for processing images in order to detect obstacles; iii) the satellite positioning system; and iv) the inertial unit.

That solution is not sufficiently safe for a civilian application. For an "all-weather" civilian application, the role carried out by the OWS is on the contrary to add safety to the GPS, and if possible without calling on an inertial unit, which is expensive.

Thus, it is known to use an inertial navigation system (INS), a GPS receiver, or a hybrid INS/GPS system for measuring the speed of the carrier vehicle as is needed for the operation of the obstacle detector on board said vehicle.

It is also known to use a lidar scanning for any possible obstacles situated in a sector in front of the helicopter by means of a laser beam, and transmitting in real time instantaneous measurements (azimuth and elevation angles for the beam, and distance measurement or range for any echo) to a computer. The computer converts the measurements into a fixed frame of reference by using the instantaneous measurements of the Euler angles (heading, attitude) coming from an inertial measurement apparatus (IRS or AHRS) and also the speed of the carrier (from an inertial unit and where appropriate a GPS), and stores these measurements in a memory in the form of a matrix of points (or "plots").

On the basis of these converted measurements, the computer generates a set of symbols often consisting in a view as seen from the cockpit of the scene as scanned by the scanning sensor, and does so at a rate that is high enough to ensure that it is "fluid": although the scene being observed is generally static, the view from the cockpit is dynamic because of the movements of the carrier.

Some such systems that rely on excellent accuracy in speed measurement enable obstacle detectors to be provided that provide excellent performance; it is then possible by image processing to extract fine details such as pylons and/or high voltage electricity cables.

Nevertheless, an analysis of such systems shows that they present drawbacks, and in particular:
  poor availability when using GPS on its own: in order to operate normally, GPS requires at least four satellites to be in view, and that is not necessarily true during a flight undertaken by a helicopter close to the ground, because of masking effects;
  mediocre performance when using only one or more inertial units: speed accuracy is of the order of one meter per second and that does not make it possible to perform fine analysis of the image constructed from the measurements of the scanning sensor; and
  high cost when using an INS solution (on its own or hybridized with a GPS).

Known systems are unsuitable for applications in which it is desired to make safe the location function based on GPS, which means that it is imperative not to use the GPS in the OWS function in order to ensure there is no common breakdown mode.

OBJECT AND SUMMARY OF THE INVENTION

The object of the invention is to propose an on-board system that is simple for estimating the speed of an aircraft relative to ground being overflown by the aircraft, together with an on-board system for detecting obstacles, in particular a system on board a rotary wing aircraft, which system incorporates such a system for estimating speed; an object of the invention is to provide such systems that are on board an aircraft or suitable for being mounted on board that are improved and/or that remedy, at least in part, the drawbacks of known systems for estimating speed and for detecting obstacles.

For this purpose, in an aspect of the invention, there is proposed a method of determining at least two components (generally horizontal components) of an estimated speed of an aircraft relative to the ground being overflown by the aircraft, by hybridizing or combining inertial measurements of the movements of the aircraft with successive measurements of the distance between the aircraft and a region of the ground.

Preferably, the inertial measurements comprise three linear acceleration components of the aircraft, and three angular speed components.

In preferred embodiments of the invention:
at least two images are formed in succession of a single region of the ground, and at least one raw or observed speed data item ($\vec{v}_R$) is determined as a function of the offset(s) ($\vec{d}$) between the images: the term "raw or observed speed data item" is used to mean either the raw or observed speed itself, or the difference between said "raw" or "observed" speed and the previously observed hybrid speed; in which case the difference can also be referred to as a "speed difference";
complementary filtering is used to filter said raw or observed speed data item with inertial measurements of the movement of the aircraft in order to form the "estimated" speed $\hat{\vec{v}}$ also referred to as the "hybrid" speed.

Preferably, an a priori covariance matrix of the error affecting the raw or observed speed measurement (or data item), and the filtering is performed by a complementary filter of variable gain (K) dependent on the covariance matrix, in particular by a Kalman filter.

The distance measurements are preferably taken from a lidar, a radar, a synthetic aperture radar (SAR), or a sonar, in particular by scanning the region of the ground that is being observed and/or overflown by the aircraft.

The images may be constituted by a series of measurements or data items relating to the distance between the aircraft and points in the observed region of the ground and corresponding to measurements delivered by a range finder; it is then possible to determine a first raw or observed speed as a function of offsets between the images.

The images may also include light intensity data for points of the observed region of the ground as delivered by at least one camera on board the aircraft; it is then possible to determine another (a second) raw or observed speed as a function of offsets between said images.

Preferably, the means for determining the raw or observed speed ($\vec{v}_R$) from the images implement a differential method.

Alternatively, the means for determining the raw or observed speed ($\vec{v}_R$) from the images implement a correlation method, a method based on energy, a method using parameterized models, or a combination of said methods.

It is also possible to combine measurements of the airspeed of the aircraft (its speed relative to the air), measurements of heading and/or magnetic field, and/or measurements of altitude and/or barometric pressure with the inertial measurements, distance measurements, and where appropriate the light intensity measurements.

In other words, and in another aspect of the invention, there is proposed a system for determining an estimated speed ($\hat{\vec{v}}$) of an aircraft, the system comprising an inertial measurement unit delivering signals or data relating to measured movements of the aircraft, the system further comprising means for measuring the distance separating the aircraft from points in a region of the ground, and hybridization means for combining the inertial measurements with the measurements delivered by the means for measuring distances and for delivering an estimated or "hybrid" speed ($\hat{\vec{v}}$).

The system preferably includes means for determining an observed or raw speed ($\vec{v}_R$) as a function of distance data or signals delivered by the distance measuring means, and the hybridization means comprise subtracter means for subtracting the observed speed from the previously determined hybrid speed so as to produce a speed difference ($\hat{\vec{v}} - \vec{v}_R$), and filter means for filtering this speed difference and the inertial measurements.

Preferably, the filter means present gain that is variable as a function of the covariances of the errors affecting the distance measurements, and as a function of the covariances of the errors affecting the inertial measurements.

The observed speed may be determined by comparing two successive series of distance measurements, and from the time interval ($\tau$) between said two series of observations of a single region of the ground.

The distance measuring means may comprise a range finder such as a radar, a lidar, a sonar, or a SAR, or else a "snapshot" range finder, the range finder delivering a plurality of three-dimensional echoes or measurements of points on the ground, or any other equivalent system providing three-dimensional information about the ground or obstacles situated in a three-dimensional region in front of the aircraft.

The system of the invention may also include a barometric altimeter, a magnetometer, and/or an airspeed sensor, together with hybridization means for combining the measurements delivered by these sensors with the inertial and distance measurements.

It may also include at least one passive observation sensor such as an infrared camera, and means for determining a second observed speed from images delivered by said sensor and from the distance measurements, in order to mitigate periods during which it is not possible to estimate raw or observed speed from distance measurements only, as for example when overflying flat terrain.

In another aspect, the invention provides a method of detecting obstacles while on board an aircraft, in particular on board a rotary wing aircraft, the method comprising the following operations:
extracting at least one item of information about the observed speed ($\vec{v}_R$) of the aircraft from a sequence of images or echoes of a stationary scene delivered by an observation sensor on board the aircraft, each image or set of echoes comprising information including relative positions (3D) of a plurality of points in the relief being overflown by the aircraft;
hybridizing the observed speed with the speed delivered by an on-board inertial sensor; and
detecting obstacles from echoes and the speed obtained by hybridizing.

In another aspect, the invention provides a system of detecting obstacles for a rotary wing aircraft, the system comprising a system of the invention for estimating at least two components of the travel speed of the aircraft, and/or being programmed to apply a method of the invention.

The invention also makes it possible to improve the rate and the accuracy with which speed is measured, to reduce or eliminate noise from the measurements taken, and to provide continuity in speed estimation. The invention makes it possible to provide an OWD that is independent of a GPS.

In a preferred embodiment, use is made of a sequence comprising two or three images or successive series of echoes delivered by a scanning range finder.

The invention does not require the range finder to be mounted on a gyro-stabilized platform; the scanning range finder is preferably secured to the helicopter, either in stationary manner or so as to be steerable in sight and/or bearing.

BRIEF DESCRIPTION OF THE DRAWINGS

Other characteristics and advantages of the invention appear from the following description which refers to the accompanying drawings and which illustrate preferred embodiments of the invention with no limiting character.

Unless stated to the contrary, identical references designate elements that are identical or similar in structure and/or function.

FIG. 1 is a diagram illustrating the integration of an aircraft speed estimator system of the invention in an on-board system for displaying obstacles.

FIG. 2 is a diagram showing the position of a frame of reference associated with a telemeter on board a helicopter.

FIG. 3 is a graph in section view showing two profiles of a region of terrain observed by a telemeter.

FIGS. 4 to 9 are three-dimensional graphs in diagrammatic perspective view showing steps in processing meshed surfaces constructed from measurement plots delivered by a telemeter, for calculating an offset between two surfaces corresponding to two successive series of measurements, and for calculating an "observed" speed—or a speed difference—from said offset.

FIG. 11 corresponds to a first embodiment of a hybridization system in which the state vector is of dimension three; FIGS. 12 to 14 correspond to a second embodiment of a hybridization system in which the state vector is of dimension twelve; FIGS. 15 to 17 correspond to a third embodiment of a hybridization system in which the state vector is of dimension nineteen; and FIG. 18 corresponds to a fourth embodiment of a hybridization system in which the state vector is of dimension three.

MORE DETAILED DESCRIPTION

Figure 10:
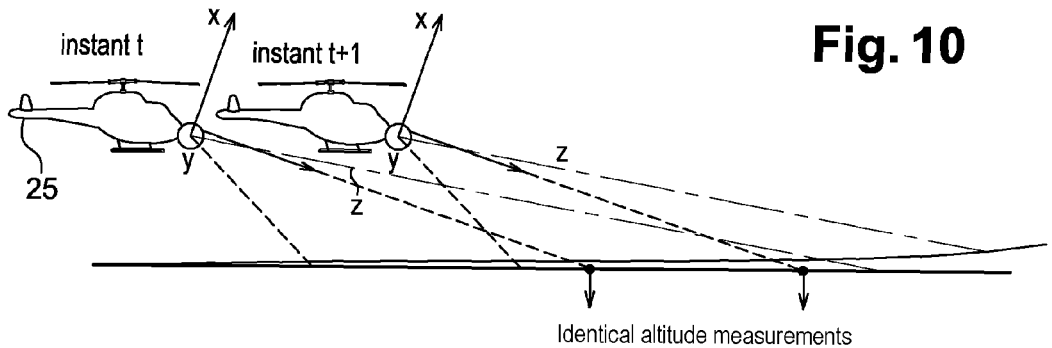
FIG. 10 is a diagram showing a helicopter overflying flat ground, in two successive ground-observation positions.

In a preferred embodiment of the invention, ground speed information is extracted from echoes returned by points on the ground and received by the scanning sensor by processing successive views (series of echoes) and by analyzing the displacements of the echoes, from one view to the next view. Implementing this sensor on its own can do no better than produce one speed measurement for each new image, i.e. at a frequency of about 1 Hz, and that does not correspond to the needs of an aircraft for measurements that are dynamic; in accordance with the invention, use is also made of an inertial measurement unit (IMU) which, by means of additional filtering, makes it possible to produce speed measurements at a high rate and to maintain an estimate for the speed of the aircraft during the stages of flight in which the scanning range finder (SRF) does not produce an echo (because altitude is too high and/or because of excessive attitude angles).

The IMU may either be dedicated to the SRF and integrated in the equipment itself, or it may be the IMU of an attitude and heading referential system (AHRS) of the kind fitted to modern helicopters. Under such circumstances, the SRF is connected to the AHRS.

FIG. 1 is a diagram showing the main components of a system 18 of the invention together with their connections for processing observation data in accordance with the invention.

A lidar 11 uses a laser beam 20 to scan for possible stationary obstacles and/or obstacles associated with a region of ground 19, including terrain relief, situated in a sector in front of the helicopter, and it transmits its instantaneous measurements (azimuth and elevation angles of the beam, and distance measurement of the echo 21, if any) in real time to a computer 17; the computer converts (blocks 12, 12') the lidar measurements (sight, bearing, and distance data) into a fixed frame of reference, stores the converted measurements in a "long-term" plot memory 14, and generates (block 15) a set of symbols, preferably using the method described in patents FR 2 712 251 and U.S. Pat. No. 5,555,175; the symbols and/or the image formed from the plots of the memory 14 are displayed on a screen 22.

The computer 17 implements the steps described below in order to estimate speed and possibly also attitude which it needs for converting lidar measurements and for generating symbols; in parallel with "conventional" processing, use is made of the measurements (or plots) coming from the lidar to perform the processing described below.

Two successive images stored respectively at a given moment in memories 14' and 14" are referred to as being an image of "rank n" and an image of "rank n+1", and at the end of processing this pair of images, the memories are permutated so that the image of "rank n" is replaced by the image of "rank n+1", and the following image is recorded in the memory 14", replacing the old image of "rank n+1".

To convert measurements into a stationary frame of reference common to two successive images stored respectively in two buffer memories 14' and 14", it is advantageous to select as the fixed frame of reference the (linear and angular) position that was occupied by the carrier (the aircraft) at the beginning of acquisition of the image of "rank n". The hybrid ground speed vector needed for this conversion is taken from a hybridization filter 13. The Euler angles that are also needed can be taken either from the hybridization filter 13 as well, or else from the AHRS 23 if the computer is connected thereto.

Thus, two successive images (or series of echoes) are stored in their respective memories 14' and 14", and then the two images are processed to determine an offset between them. For this purpose, various embodiments of the invention can be envisaged, depending on whether the looked-for offset is a pure translation (3 degrees of freedom) or a translation accompanied by a rotation (6 degrees of freedom).

In the diagram of FIG. 1, an offset identifier 16 performs processing suitable for extracting a pure translation.

This translation $\vec{d}$ is equal to $\tau \Delta \vec{v}$ where $\tau$ is the known time interval between the acquisitions of the two successive images being processed together in order to determine their offset, and where the vector $\Delta \vec{v}$ is the difference between the estimated speed (hybrid speed) and the speed observed on the basis of raw measurements; this speed offset $\Delta \vec{v}$ is then calculated as $$\frac{1}{\tau}\vec{d}.$$

The processing of successive images that makes it possible to evaluate the offset $\vec{d}$ can take different forms, some of which are described in detail below. Amongst the various embodiments of the invention, it is possible to process pairs or triplets of image portions rather than pairs or triplets of entire images.

Various methods can be used in order to evaluate the speed vector using imaging methods.

The preferred solution consists in using a differential method based on keeping the distribution of altitudes: the looked-for translation must be smaller than the finest detail in the scene so that an approximation by development limited to the first order remains legal. This method is well adapted since the rate at which the range finger acquires images is of the order of 1 Hz, and the expected speed difference is of the order of one meter per second, i.e. an amplitude in translation of meter order between successive images, which is generally smaller than the unevenness of the terrain.

Other methods could be used, in particular:
- a correlation method based on sets of points where variation is high. These patterns are called markers. The speed vector is then obtained by maximizing a similarity measurement on a marker; or
- a method based on energy, using a family of space-time filters tuned on certain frequencies in order to extract information about movement; or
- a method using parameterized models based on a parameterized model of movement. This identification is performed by the best fit of the parameters of the model.

According to a preferred characteristic of the invention, offsets are identified in a pair of successive images by a differential method, and the hybridization filter 13 is sustained between the inertial measurements coming from the IMU 23 and the speed errors identified by the processing of the successive images.

Determining an "Observed Speed" Vector from Range-Finger Measurements

In accordance with an aspect of the invention, an inertial speed bias is identified by processing ground range data delivered by a range finder.

The surface constituted by the terrain and obstacles as scanned by the beam is a stationary surface sheet $z(x,y)$ that is a function of two coordinates x and y.

In order to keep it stationary, the frame of reference $(x,y,z)$ needs to be a fixed frame of reference, i.e. associated with the ground.

The frame of reference $(x,y,z)$ shown in FIG. 2 is the frame of reference of the lidar 11 at some given instant $t_0$. All of the lidar measurements in a given processing batch need to be projected into the same fixed frame of reference.

The frame of reference selected for the lidar is such that it coincides with the frame of reference of the helicopter (i.e. x>0=forwards, y>0=to the right, and z>0=downwards), in an assumed position where it is "looking" downwards. It is therefore derived from the frame of reference of the carrier merely by rotation through an angle $\theta_1$ about the y axis that is common to the frames of reference of the helicopter and of the lidar.

It can be assumed that the angular speed measurement is sufficiently accurate to be able to ignore the angle error that accumulates during the time between two successive views converted into this initial frame of reference. Any rotation term is thus ignored between these two views.

However, because of the bias $\Delta\vec{v}$ that affects the speed vector measurement used for converting successive measurements into the initial frame of reference, the two views appear to be moved in translation (shifted) relative to each other by a distance $\vec{d}=\tau\Delta\vec{v}$, where $\tau$ is the time offset—which is known—between the taking of each of the two views (identified by indices 1 and 2):

$$z_2(x,y)=z_1(x+\Delta x,y+\Delta y)+\Delta z \qquad \text{equation 1}$$

where $[\Delta x\ \Delta y\ \Delta z]^T$ is the translation vector between the two views.

The graph of FIG. 3 is a section in the [x,y] plane for the special case where $\Delta y$ is zero.

If the component of the three-dimensional offset in the [x,y] plane is sufficiently small, a valid approximation for $z(x+\Delta x, y+\Delta y)$ is obtained by a development limited to the first order:

$$z(x+\Delta x, y+\Delta y) = z(x,y) + \frac{\partial z}{\partial x}\Delta x + \frac{\partial z}{\partial y}\Delta y$$

$$= z(x,y) + \begin{bmatrix} \frac{\partial z}{\partial x} & \frac{\partial z}{\partial y} \end{bmatrix}_{(x,y)} \begin{bmatrix} \Delta x \\ \Delta y \end{bmatrix}$$

where:

$$\begin{bmatrix} \frac{\partial z}{\partial x} \\ \frac{\partial z}{\partial y} \end{bmatrix}_{(x,y)} \qquad \text{equation 2}$$

is the altitude gradient of the terrain relative to the [x,y] plane, and $$\begin{bmatrix} \Delta x \\ \Delta y \end{bmatrix}$$

is the horizontal portion of the three-dimensional offset between the two views.

Note: the quantity referred to herein as "altitude" is in fact a distance between a point on the ground 19 from the [x,y] plane of the on-board lidar, as measured along the z axis.

By combining above equations (1) and (2), the following equation is obtained:

$$z_2 - z_1 = \frac{\partial z}{\partial x}\Delta x + \frac{\partial z}{\partial y}\Delta y + \Delta z$$

Or in matrix notation:

$$z_2 - z_1 = \begin{bmatrix} \frac{\partial z}{\partial x} & \frac{\partial z}{\partial y} & 1 \end{bmatrix} \begin{bmatrix} \Delta x \\ \Delta y \\ \Delta z \end{bmatrix} \qquad \text{equation 3}$$

From this expression, applied to three points $[x_1,y_1]$, $[x_2,y_2]$, and $[x_3,y_3]$ of the [x,y] plane from which the altitude difference $\delta z$ and the two components $\partial z/\partial x$ and $\partial z/\partial y$ of the altitude gradient are taken, there is obtained a linear system of three equations in three unknowns ($\Delta x$, $\Delta y$, and $\Delta z$):

$$\begin{bmatrix} \delta z_1 \\ \delta z_2 \\ \delta z_3 \end{bmatrix} = \begin{bmatrix} \frac{\partial z_1}{\partial x_1} & \frac{\partial z_1}{\partial y_1} & 1 \\ \frac{\partial z_2}{\partial x_2} & \frac{\partial z_2}{\partial y_2} & 1 \\ \frac{\partial z_3}{\partial x_3} & \frac{\partial z_3}{\partial y_3} & 1 \end{bmatrix} \begin{bmatrix} \Delta x \\ \Delta y \\ \Delta z \end{bmatrix}$$

If the terrain is not flat, three points can be found such that the system is not bound. Solving the system then produces the looked-for offset $[\Delta x\ \Delta y\ \Delta z]^T$.

Since the image is noisy, but made up of hundreds of points, it is advantageous to make use of the least squares method over the largest possible number of points in the image.

The main steps in the algorithm for calculating the offset between two images (or series of three-dimensional plots) are shown diagrammatically in FIGS. 4 to 9, in which:

FIGS. 4 and 5 are respective perspective views of two surfaces $z_1(x,y)$ and $z_2(x,y)$ corresponding to two successive images of the relief in a region of the ground scanned by the lidar;

FIGS. 6 and 7 are respective perspective views of a mean surface $z_m$ and a difference surface $\delta z$ which are calculated respectively from the surfaces $z_1$ and $z_2$ by the following formulae:

$z_m = (z_1+z_2)/2$; and $\delta z = z_1 - z_2$

FIGS. 8 and 9 are respective perspective views of a first sheet derived from the mean sheet $z_m$ and a second sheet derived from the mean sheet $z_m$, with respect to x and to y, i.e. $\partial z_m/\partial x$ and $\partial z_m/\partial y$ respectively.

In order to calculate digitally the "mean" image (FIG. 6) and the "difference" image (FIG. 7) from the two images of FIGS. 4 and 5, they are re-sampled using a common grid that is square and of pitch size s, in the [x,y] plane.

The approximations of the "partial derivative" images relative to x (FIG. 8) and to y (FIG. 9) are then obtained by dividing the difference between the two altitudes adjacent to the plot in question along the axis in question by twice the pitch size s of the grid, using the following formulae:

$$\left.\frac{\partial z}{\partial x}\right|_{i,j} \approx \frac{z_{i+1,j} - z_{i-1,j}}{2s} \text{ and } \left.\frac{\partial z}{\partial y}\right|_{i,j} \approx \frac{z_{i,j+1} - z_{i,j-1}}{2s}$$

Note: the altitudes ($z_{i,j}$) manipulated in the above formulae are the altitudes of the mean image (FIG. 6) between the two input images (FIGS. 4 and 5).

In order to identify the coefficients or components $\Delta x$, $\Delta y$, and $\Delta z$ of the offset between the initial images, the "least squares with constant" method is applied between the "difference" image (dependent variable) and the two "partial derivative" images relative to x and to y (independent variables):

[difference]=[partial derivative/x]*$\Delta x$+[partial derivative/y]*$\Delta y$+$\Delta z$ Starting from equation (3), for a point of arbitrary index "i" (this index scans over the entire surface of the image) and using the notation $p_{x_i}$ and $p_{y_i}$ for the local partial derivatives at said point along the axes x and y respectively, (p as in slope), calculation continues as follows:

Equation (3) can be written in the following form:

$$\delta z_i = \begin{bmatrix} p_{x_i} & p_{y_i} & 1 \end{bmatrix} \begin{bmatrix} \Delta x \\ \Delta y \\ \Delta z \end{bmatrix}$$

This equation is transformed by multiplying its two members by the transpose of the slope matrix:

$$\begin{bmatrix} p_{x_i} \\ p_{y_i} \\ 1 \end{bmatrix} \delta z_i = \begin{bmatrix} p_{x_i} \\ p_{y_i} \\ 1 \end{bmatrix} \begin{bmatrix} p_{x_i} & p_{y_i} & 1 \end{bmatrix} \begin{bmatrix} \Delta x \\ \Delta y \\ \Delta z \end{bmatrix}$$

$$= \begin{bmatrix} p_{x_i}^2 & p_{x_i}p_{y_i} & p_{x_i} \\ p_{x_i}p_{y_i} & p_{y_i}^2 & p_{y_i} \\ p_{x_i} & p_{y_i} & 1 \end{bmatrix} \begin{bmatrix} \Delta x \\ \Delta y \\ \Delta z \end{bmatrix}$$

By summing the above equation over a large number of points, the following equation is obtained:

$$\sum_i \begin{bmatrix} \delta z_i p_{x_i} \\ \delta z_i p_{y_i} \\ \delta z_i \end{bmatrix} = \sum_i \begin{bmatrix} p_{x_i}^2 & p_{x_i}p_{y_i} & p_{x_i} \\ p_{x_i}p_{y_i} & p_{y_i}^2 & p_{y_i} \\ p_{x_i} & p_{y_i} & 1 \end{bmatrix} \begin{bmatrix} \Delta x \\ \Delta y \\ \Delta z \end{bmatrix}$$

This equation leads to the following expression for the looked-for offset $\vec{d}$ between the two initial images:

$$\vec{d} = \begin{bmatrix} \Delta x \\ \Delta y \\ \Delta z \end{bmatrix} = \left( \sum_i \begin{bmatrix} p_{x_i}^2 & p_{x_i}p_{y_i} & p_{x_i} \\ p_{x_i}p_{y_i} & p_{y_i}^2 & p_{y_i} \\ p_{x_i} & p_{y_i} & 1 \end{bmatrix} \right)^{-1} \sum_i \begin{bmatrix} p_{x_i}\delta z_i \\ p_{y_i}\delta z_i \\ \delta z_i \end{bmatrix} \quad \text{equation 4}$$

Thus, this equation is used by the modules 16, 116, 216, 316, 416 (FIGS. 1, 11, 12, 15, and 18 respectively) for calculating the offset between two images formed in succession from the lidar measurement plots.

The processing of the images provided in succession by the lidar also includes calculating a covariance matrix V of the error that affects the difference or offset as determined in this way; this calculation is performed by the respective modules 117, 217, 317, 417 of FIGS. 11, 12, 15, and 18.

This covariance matrix characterizes the quality of the speed assistance (observed speed), that depends at each instant on the shape of the terrain and the obstacles being overflown, and to a lesser extent on the quality of the range finger (fineness of the beam, amount of vibration in its deflector devices, etc. . . . ). In the presence of terrain that is completely flat, the device can no longer provide any information whatsoever about the speed component in the plane of the terrain being overflown, which plane is generally substantially horizontal. The corresponding terms of the covariance matrix for the observed speed error (i.e. the variances for the north and east components, assuming the terrain is horizontal) tend towards infinity.

In contrast, in the presence of relief, and providing the pitch of the scan is sufficiently fine to avoid "space frequency" folding, then horizontal error variances decrease.

Briefly, the algorithm for extracting the "observed" speed vector is as follows: the input to the algorithm is constituted by the set of 2N three-dimensional plots or vectors constituting two images. The symbols $\theta_{Bi}$, $\tau_{Bi}$, and $\rho_{Bi}$ designate respectively the bearing, the sight, and the length of the laser beam (whence the suffixes "B") for the plot of index i. It can be seen that the bearing, sight, and length of plot i together form the vector $\vec{r}_i$.

The output $\vec{v}$ from the algorithm is made up of three speed components.

The algorithm is purely combinational (i.e. it does not possess any memory). It thus consists in three analytic expressions:

$$v_x = \frac{d_x(\theta_{Bi}, \psi_{Bi}, \rho_{Bi})}{\tau}$$

$$v_y = \frac{d_y(\theta_{Bi}, \psi_{Bi}, \rho_{Bi})}{\tau} \text{ or, vectorially } \vec{v} = \frac{\vec{d}(\vec{r}_i)}{\tau}$$

$$v_z = \frac{d_z(\theta_{Bi}, \psi_{Bi}, \rho_{Bi})}{\tau}$$

Where $\vec{d}$ is the translation vector between the two images; and $\tau$ is the time between the two images.

$\vec{d}$ is a vector function of 6N variables (or 2N triplets) $\theta_{Bi}$, $\psi_{Bi}$, and $\rho_{Bi}$.

When the algorithm is implemented, each of the variables is the subject of a certain amount of error.

These errors relating to sight, bearing, and distance measurements are written as follows $\tilde{\theta}_{Bi}$, $\tilde{\psi}_{Bi}$ and $\tilde{\rho}_{Bi}$.

If the function $\vec{d}$ is linear, the resulting error on $\vec{v}$ can be deduced immediately:

$$\tilde{\vec{v}} = \frac{1}{\tau^2} \sum_i \begin{bmatrix} \frac{\partial d_x}{\partial \theta_{Bi}} & \frac{\partial d_x}{\partial \psi_{Bi}} & \frac{\partial d_x}{\partial \rho_{Bi}} \\ \frac{\partial d_y}{\partial \theta_{Bi}} & \frac{\partial d_y}{\partial \psi_{Bi}} & \frac{\partial d_y}{\partial \rho_{Bi}} \\ \frac{\partial d_z}{\partial \theta_{Bi}} & \frac{\partial d_z}{\partial \psi_{Bi}} & \frac{\partial d_z}{\partial \rho_{Bi}} \end{bmatrix} \begin{bmatrix} \tilde{\theta}_{Bi} \\ \tilde{\psi}_{Bi} \\ \tilde{\rho}_{Bi} \end{bmatrix} \text{ or, vectorially}$$

equation 5

$$\tilde{\vec{v}} = \frac{1}{\tau^2} \sum_i \frac{\partial \vec{d}}{\partial \vec{r}_i} \tilde{\vec{r}}_i$$

If the function $\vec{d}$ is not linear, the above expression for the speed error remains valid providing the input errors are small in amplitude. This condition is always true in practice.

It should be observed that regardless of the mathematical expression for $\vec{d}$, it is always possible to establish the partial derivative matrix that appears in equation 5, since any analytic expression can be differentiated.

It is assumed that the three errors concerning the sight, bearing, and distance measurements of a plot are independent.

The covariance matrix of these three errors is then as follows:

$$R = \begin{bmatrix} \sigma^2_{\theta_{Bi}} & 0 & 0 \\ 0 & \sigma^2_{\psi_{Bi}} & 0 \\ 0 & 0 & \sigma^2_{\rho_{Bi}} \end{bmatrix}$$

Where $\sigma_{\theta_{Bi}}$, $\sigma_{\psi_{Bi}}$ and $\sigma_{\rho_{Bi}}$ are the standard deviations of the errors concerning sight, bearing, and distance respectively. The non-diagonal terms (the covariances) are zero because of the assumption that they are independent.

It is also assumed that the measurement errors in successive plots are likewise independent (or in other words that the errors are made up of "white" noise). The "a priori" covariance matrix of the speed error is then deduced form equation 5:

equation 6

$$V = \text{cov}(\tilde{\vec{v}})$$

$$= \frac{1}{\tau^2} \sum_i \begin{bmatrix} \frac{\partial d_x}{\partial \theta_{Bi}} & \frac{\partial d_x}{\partial \psi_{Bi}} & \frac{\partial d_x}{\partial \rho_{Bi}} \\ \frac{\partial d_y}{\partial \theta_{Bi}} & \frac{\partial d_y}{\partial \psi_{Bi}} & \frac{\partial d_y}{\partial \rho_{Bi}} \\ \frac{\partial d_z}{\partial \theta_{Bi}} & \frac{\partial d_z}{\partial \psi_{Bi}} & \frac{\partial d_z}{\partial \rho_{Bi}} \end{bmatrix} \begin{bmatrix} \sigma^2_{\theta_{Bi}} & 0 & 0 \\ 0 & \sigma^2_{\psi_{Bi}} & 0 \\ 0 & 0 & \sigma^2_{\rho_{Bi}} \end{bmatrix}$$

$$\begin{bmatrix} \frac{\partial d_x}{\partial \theta_{Bi}} & \frac{\partial d_y}{\partial \theta_{Bi}} & \frac{\partial d_z}{\partial \theta_{Bi}} \\ \frac{\partial d_x}{\partial \psi_{Bi}} & \frac{\partial d_y}{\partial \psi_{Bi}} & \frac{\partial d_z}{\partial \psi_{Bi}} \\ \frac{\partial d_x}{\partial \rho_{Bi}} & \frac{\partial d_y}{\partial \rho_{Bi}} & \frac{\partial d_z}{\partial \rho_{Bi}} \end{bmatrix}$$

or vectorially $\text{cov}(\tilde{\vec{v}}) = \frac{1}{\tau^2} \sum_i \frac{\partial \vec{d}}{\partial \vec{r}_i} R \frac{\partial \vec{d}^T}{\partial \vec{r}_i}$ It then suffices to know the noise amplitude inherent to the SRF sensor—or the corresponding covariance matrix—in order to deduce the covariance matrix V (FIGS. 11, 12, 15, 18) affecting the extraction of the speed vector from the images or series of plots.

The offset (vector) $\vec{d}$ and consequently the speed difference are calculated by the respective modules 16, 116, 216, 316, or 416 of FIGS. 1, 11, 12, 15, or 18, while the covariance matrix V for the errors affecting this difference is determined by the respective modules 117, 217, 317, 417 of FIGS. 11, 12, 15, 18.

In certain circumstances, errors involving sight and bearing angles can be ignored ($\sigma_{\theta_{Bi}}=0$ and $\sigma_{\psi_{Bi}}=0$) and account need only be taken of distance error. If it is also accepted that the standard deviation $\sigma_{\rho_B}$ of this error is constant (i.e. independent of the distance itself, for example), the expression for equation 6 can be simplified as follows:

$$\text{cov}(\tilde{\vec{v}}) = \frac{\sigma^2_{\rho_B}}{\tau^2} \sum_i \begin{bmatrix} \frac{\partial d_x}{\partial \rho_{Bi}} \\ \frac{\partial d_y}{\partial \rho_{Bi}} \\ \frac{\partial d_z}{\partial \rho_{Bi}} \end{bmatrix} \begin{bmatrix} \frac{\partial d_x}{\partial \rho_{Bi}} & \frac{\partial d_y}{\partial \rho_{Bi}} & \frac{\partial d_z}{\partial \rho_{Bi}} \end{bmatrix}$$

(6')

Estimating the "Observed" Speed Vector by Associating a Range Finder with a Camera As described above, in order to measure an "observed" speed vector, the difference is taken between two successive plot images, and then the "observed" speed is estimated by the least squares method.

3D plots are available acquired using information concerning sight, bearing, distance, attitude (heading, roll, pitch) and time (the time at which the plot was acquired). On the basis of this information, the plots are converted into a Cartesian space so as to obtain x, y, and z.

In order to calculate the "observed" speed vector solely from range-finder measurements, it is preferable to apply the differential method to two acquisition series of plots that have been converted and timed.

Nevertheless, in the absence of any relief on the ground, as shown diagrammatically in FIG. 10, a method of calculation based on the "altitudes" z as a function of x and y in the plane becomes ineffective. Since the altitude remains the same, there is no information on which to estimate an offset in three dimensions.

In order to mitigate this problem, a camera is used that observes the same region of the ground as is scanned by the range finder.

In this variant of the invention, a 2D imager is used, e.g. an FLIR camera and/or a low light level (LLL) camera. Processing successive images in a manner similar to that described above provides an offset in terms of image pixels, which corresponds to an angular offset (offset of the image in the field of the camera). This angular offset is not directly usable for estimating linear speed. However, combining this offset with the measurements coming from the SRF makes it possible to determine the distance to each of the points in the IR or LLL image, and thus to convert the observed angular speed into a linear speed.

The term "camera" is used to designate any type of passive sensor that picks up and measures the intensity of a wavelength at a given location in an image. For example an infrared camera provides an image in which the visible light contrast is proportional to the temperature contrast of the observed object. The brightness contrast relating to a surface being studied is referred to as intensity and written I.

The following notation is used:
the data provided by the camera forms a matrix of pixels;
each camera pixel is associated with coordinates x and y, and with an intensity written I;
for the range finder, the Cartesian coordinates as converted into the observed space are used and written $(x_t, y_t, z_t)$; and
f is the focal length of the camera.

Each point of coordinates (x,y) in the focal plane of the camera, is associated with a corresponding point $(x_t, y_t)$ in the range-finder frame of reference, together with the light intensity I(x,y) of said point.

Using this correspondence, a transformed image is made by applying the following formulae:

$$\frac{x}{\sqrt{x^2 + f^2}} = -\frac{x_t}{z_t}$$

$$\frac{y}{\sqrt{y^2 + f^2}} = -\frac{y_t}{z_t}$$

Figure 19:
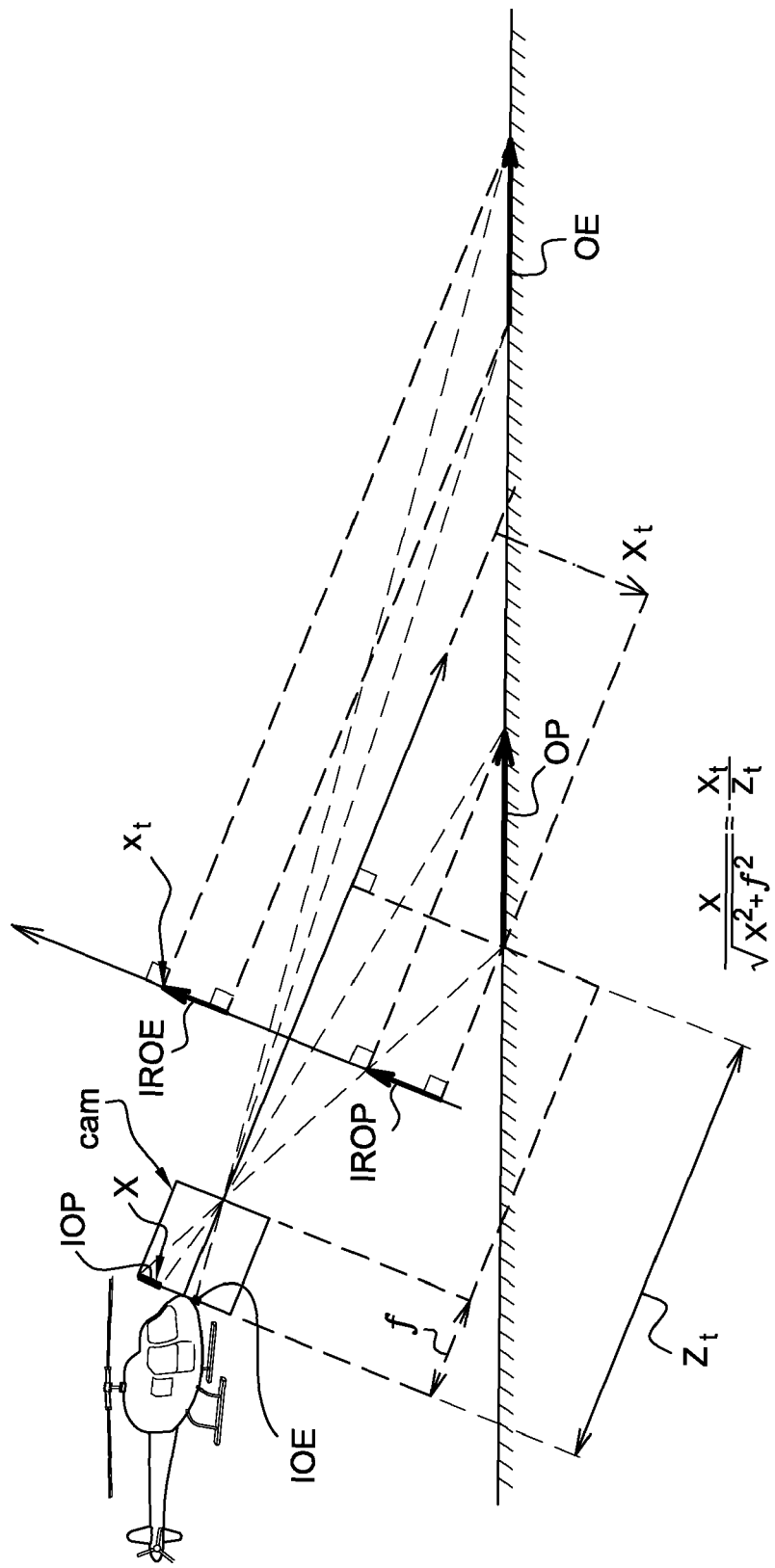
FIG. 19 is a diagram showing the transformation of an image delivered by a camera into a frame of reference associated with a telemeter on board a helicopter.

This transformation as shown in FIG. 19 makes it possible to obtain geometrical projections IROP and IROE (in the [xt,yt] plane) from the optical projections IOP and IOE in the focal plane of the camera CAM. FIG. 19 shows clearly how the optical projection 10E of the remote object OE is smaller than the optical projection IOP of the near object OP, while the geometrical projections IROE and IROP keep their respective proportions.

In order to increase the number of usable image points, the camera and the range finder need to have substantially the same fields of view and the same observation direction; in addition, the device includes means for synchronizing the acquisitions performed by these two appliances.

Furthermore, the range-finder image is preferably re-sampled so as to coincide with the pixels of the camera.

A second observation of the speed vector is extracted by using two successive transformed images separated by a known time interval τ.

To measure speed, it is necessary to identify the offset metric $\vec{d}$ between the two images. The looked-for speed is then $$v_c = \frac{\vec{d}}{\tau}.$$

To identify this offset, several imaging methods can be used (differential, correlation, or parametric) on two (or more) successively-acquired images.

There follows a description of the differential method, which is close to the above-described processing on the measurements coming from range finder alone, however this method acts in two dimensions instead of three.

Two intensity partial derivative images are formed initially, respectively relating to the coordinates x and y, and written as follows:

$$\frac{\partial I}{\partial x}(x, y), \frac{\partial I}{\partial y}(x, y)$$

The difference image is also formed between the two successive images of respective intensities $I_1$ and $I_2$, by applying the formula:

$$\delta I(x,y) = I_2(x,y) - I_1(x,y)$$

For each point of coordinates (x,y) the relationship associating the intensity difference and the two partial derivatives of said intensity is as follows (first order development and assuming that the offset is small):

$$\delta I(x, y) = \frac{\partial I}{\partial x}\Delta x + \frac{\partial I}{\partial y}\Delta y$$

Or in matrix form:

$$\delta I(x, y) = \begin{bmatrix} \frac{\partial I}{\partial x} & \frac{\partial I}{\partial y} \end{bmatrix} \begin{bmatrix} \Delta x \\ \Delta y \end{bmatrix}$$

By multiplying the terms of the preceding equation by $$\begin{bmatrix} \frac{\partial I}{\partial x} \\ \frac{\partial I}{\partial y} \end{bmatrix},$$

and then summing for all of the points in the image plane, associating each pixel (x,y) with an index i, and writing the intensity difference at said pixel between two images acquired successively by the camera as $\delta I_i$, and by applying the least squares method, the following expression is obtained:

$$\sum_i \begin{bmatrix} \frac{\partial I}{\partial x_i} \\ \frac{\partial I}{\partial y_i} \end{bmatrix} \delta I_i = \left( \sum_i \begin{bmatrix} \frac{\partial I}{\partial x_i} \\ \frac{\partial I}{\partial y_i} \end{bmatrix} \begin{bmatrix} \frac{\partial I}{\partial x_i} & \frac{\partial I}{\partial y_i} \end{bmatrix} \right) \begin{bmatrix} \Delta x \\ \Delta y \end{bmatrix}$$

which is equivalent to the following expression that makes it possible to calculate the offset $\vec{d}$ (in the fixed frame of reference associated with the position that was occupied by the carrier at instant $t_0$):

$$\vec{d} = \begin{bmatrix} \Delta x \\ \Delta y \end{bmatrix} = \left( \sum_i \begin{bmatrix} \frac{\partial I^2}{\partial x_i^2} & \frac{\partial I^2}{\partial x_i \partial y_i} \\ \frac{\partial I^2}{\partial x_i \partial y_i} & \frac{\partial I^2}{\partial y_i^2} \end{bmatrix} \right)^{-1} \sum_i \begin{bmatrix} \frac{\partial I}{\partial x_i} \\ \frac{\partial I}{\partial y_i} \end{bmatrix} \delta I_i$$

The advantage of this variant of the invention is that it provides information about observed speed when overflying flat terrain—for which range finder does not observe any offset from one image to the next, and providing the FLIR or LLL imager can observe some contrast in luminance.

Hybridizing Inertial Measurements and the "Observed" Speed Using a Kalman Filter The hybridization filter can take various forms, some of which are shown in detail in FIGS. 11 to 18 and are described below. The advantage of this filter is to extract the best from the two categories of measurements (data) input thereto: the short-term stability of the inertial measurement and the long-term accuracy of the observed speed estimate based on evaluating the offset position difference between successive images.

In a variant embodiment, the measurements can be stored in the image memories without taking speed into account, in which case the offset identifier provides a measurement of speed itself rather than a speed difference.

In another variant, the processing of successive images is not performed on two images, but on three or more images; in another variant, this processing is performed on images that are spaced farther apart in time than by a single image cycle, rather than on images that are strictly consecutive.

Notation Used with Reference to FIGS. 11 to 18

A scalar physical magnitude (e.g. the north component of ground speed) is written using a lower case letter, e.g. x.

A direct measurement (e.g. the measurement of a magnetic field as measured by a magnetometer) of said magnitude is given a subscript m and written $x_m$.

An estimate of said physical magnitude, coming from a prediction model is written $\hat{x}$.

The error associated with the measurement or the estimate of the physical magnitude is written $\tilde{x}$.

The following relationships are supplied:

$x_m = x + \tilde{x}$ (measurement=physical magnitude+measurement error); or $\hat{y} = y + \tilde{y}$ (estimate=physical magnitude+estimation error).

This notation is applied in the same manner to vector magnitudes. For a vector physical magnitude (e.g. ground speed), written $\vec{x}$, the direct measurement, the estimate, and the error related thereto are respectively written as follows: $\vec{x}_m$, $\hat{\vec{x}}$ and $\tilde{\vec{x}}$.

In order to distinguish a vector from one of its components, the component is given a subscript to designate its position (e.g. north, east, or down). Thus, the speed vector can be written $\vec{v}$, or in the form of a column table of its three components:

$$\begin{bmatrix} v_n \\ v_e \\ v_d \end{bmatrix}$$

For a scalar physical magnitude written x, the variance of the error $\tilde{x}$ applicable to x is written X, and likewise for a vector physical magnitude written $\vec{x}$ the matrix of variances and covariances of the error $\tilde{\vec{x}}$ applicable to $\vec{x}$ is written X.

It can be seen that the above rule leads to identical notation for a matrix or for a scalar. In order to distinguish the matrix of variances and covariances from one of its components, each component is given two subscripts identifying the positions of the two components from which it is derived. Thus, the variance of the error associated with the north component of speed (written $v_n$) is written $V_{nn}$, while the matrix of variances and covariances for the error associated with the speed vector (written $\vec{v}$) is written V. A covariance component (i.e. a non-diagonal term of the matrix) is written with two different subscripts (e.g.: $V_{ne}$).

For signals "in continuous time", white noise has infinite variance (or power). In order to characterize its amplitude, it is its power spectral density (PSD) that is taken into account. Depending on whether the signal is scalar or vector, its PSD is respectively in scalar or in matrix form.

The PSDs are written in the same manner as the variances or the variance covariance matrices, i.e. using an uppercase letter:

the PSD of the error $\tilde{x}$ applicable to x is written X;

the PSD of the error $\tilde{\vec{x}}$ applicable to $\vec{x}$ is written X.

Note: there can be no confusion between a variance and a PSD, since a given noise is either "of finite power" or "of finite PSD".

When necessary, the subscript "c" is used for measurements of acceleration and angular speed to indicate that the measurements are in a carrier frame of reference.

Formulation of the Kalman Filters

Ignoring exceptions, Kalman filters are formulated as follows:

$\dot{\vec{x}} = A\vec{x} + B\vec{u}$ $\vec{z} = C\vec{x} + D\vec{u}$

Where $\vec{x}$ is the state vector, $\vec{u}$ is the control vector, and $\vec{z}$ is the observation. A, B, C, and D are matrices.

The variance and covariance matrix for the error associated with $\vec{u}$ is written U, the PSD matrix for the error associated with $\vec{x}$ is written X.

When the state vector can be summarized as a single physical parameter (e.g. the speed vector $\vec{v}$), the usual name for this physical parameter is used rather than its generic name $\vec{x}$. The same rule applies to the control and observation vectors.

In most of the filters described, the inertial measurement is constituted by an acceleration vector and a rotation vector. Under such circumstances, these two measurements are written collectively $\vec{u}$ (since that is the control vector). In similar manner, in embodiments where an imager is used, there are two speed observations. The vector made up of these two observations cannot be written $\vec{v}$ (since it is not a speed). It is then written $\vec{z}=[v_{nt}\ v_{et}\ v_{dt}\ v_{nc}\ v_{ec}\ v_{dc}]^T$ (where the subscripts t and c refer respectively to the range finder (telemeter) and to the camera).

| DEFINITION OF THE VARIABLES USED IN FIGS. 11 TO 18 | |
|---|---|
| $\vec{u}$ | $= [\vec{\gamma}\ \vec{\omega}]^T$ control vector made up of two measurements, an acceleration measurement and an angular speed measurement |
| U | $= \begin{bmatrix} \Gamma & 0 \\ 0 & \Omega \end{bmatrix}$ covariance matrix for the errors concerning the inertial measurements (the non-diagonal terms are zero because of the assumptions that acceleration errors and angular speed errors are independent) |
| $\vec{\gamma}$ | "true" acceleration in the carrier frame of reference |
| $\vec{\gamma}_m$ | acceleration as measured by the three accelerometers (organized on three axes) associated with the carrier |
| $\vec{w}_\gamma$ | white noise generating accelerometer noise (involved in Markov modeling of said noise) |
| $\tilde{\gamma}$ | error (or noise) in acceleration measurement |
| $\hat{\gamma}_B$ | estimate of the accelerometer bias at the output from the Kalman filter |
| $\delta\vec{\gamma}_B$ | derivative of the estimated accelerometer bias (one of the components of the Kalman correction vector) |
| $\Gamma$ | $= \begin{bmatrix} \Gamma_{xx} & 0 & 0 \\ 0 & \Gamma_{yy} & 0 \\ 0 & 0 & \Gamma_{zz} \end{bmatrix}$ covariance matrix for the errors in the acceleration measurements. The non-diagonal terms are zero because of the assumption that the three components are each subjected to noise independently |
| $\vec{\omega}$ | "true" angular speed in the carrier frame of reference |
| $\vec{\omega}_m$ | angular speed measured by the three gyros (organized on three axes) associated with the carrier |
| $\vec{w}_\omega$ | white noise involved in the Markov model or the generator of the noise that affects angular velocity measurement |
| $\tilde{\omega}$ | error (or noise) in measuring angular velocity |
| $\hat{\omega}_B$ | estimated gyro bias at the outlet from the Kalman filter |
| $\delta\vec{\omega}_B$ | derivative of the estimated gyro bias (one of the components of the Kalman correction vector) |
| $\Omega$ | $= \begin{bmatrix} \Omega_{xx} & 0 & 0 \\ 0 & \Omega_{yy} & 0 \\ 0 & 0 & \Omega_{zz} \end{bmatrix}$ covariance matrix of the errors of angular speed measurements. The non-diagonal terms are zero because of the assumption that the noise affecting each of the three components is independent |

-continued

| DEFINITION OF THE VARIABLES USED IN FIGS. 11 TO 18 | |
|---|---|
| $\hat{\phi}, \hat{\theta}, \hat{\psi}$ | estimated roll, pitch, and magnetic heading angles respectively, at the outlet from the Kalman filter |
| $\tilde{\theta}$ | VPF error: the three components are three small Euler angles between the true geographical frame of reference and the frame of reference of the VPF (it should be observed that these are not directly errors concerning the angles $\hat{\phi}, \hat{\theta}, \hat{\psi}$, but that they can be calculated from $\vec{\theta}$ and $\hat{\phi}, \hat{\theta}, \hat{\psi}$) |
| $\delta\vec{\theta}$ | derivative of the estimated VPF error (one of the components of the Kalman correction vector) |
| $\hat{v}$ | estimated ground speed at the outlet from the Kalman filter |
| $\tilde{v}$ | error affecting the estimated ground speed $\left(\tilde{v} = \hat{v} - \vec{v}\right)$ |
| $\vec{v}_{air}$ | airspeed vector (i.e. the speed of the aircraft relative to a frame of reference that is geographically oriented, but associated with the mass of air) |
| $v_{airm}$ | measured modulus of the airspeed vector (i.e. speed of the aircraft relative to a frame of reference that is geographically oriented but associated with the mass of air) as measured by the air data computer (ADC) |
| $\hat{v}_{air}$ | estimated airspeed vector |
| $\hat{w}$ | estimated wind (two components, north and east, the vertical component being assumed to be zero) |
| $\tilde{w}$ | error in estimated wind |
| $\delta\vec{w}$ | derivative of estimated wind (one of the components of the Kalman correction filter) |
| $\tilde{v}_{air}$ | error affecting the estimated airspeed vector |
| $\hat{v}_{air}$ | estimated modulus of the airspeed vector |
| $\tilde{v}_{air}$ | error affecting the estimated modulus of the air-speed vector |
| $v_v$ | vertical speed (vertical component of the ground speed vector $\vec{v}$) |
| $\hat{v}_v$ | estimated vertical speed (vertical component of the estimated ground speed vector $\hat{v}$) |
| $\hat{v}_{vb}$ | estimate of barometric vertical speed (duplicate of the preceding term) |
| $\tilde{v}_v$ | error affecting the estimated vertical speed |
| $\vec{h}_e$ | terrestrial magnetic field |
| $\hat{h}_e$ | estimated terrestrial magnetic field |
| $\tilde{h}_e$ | error affecting the estimated terrestrial magnetic field |
| $\delta\vec{h}_e$ | derivative of the estimated terrestrial magnetic field (one of the components of the Kalman correction vector) |
| $\vec{h}_c$ | disturbing field associated with the carrier and generated thereby |
| $\hat{h}_c$ | estimate of the disturbing field |
| $\tilde{h}_c$ | error affecting the estimate of the disturbing field |
| $\delta\vec{h}_c$ | derivative of the estimate of the disturbing field (one of the components of the Kalman correction vector) |
| $\vec{h}$ | total field in the carrier frame of reference |
| $\hat{h}$ | estimate of the total field in the carrier frame of reference |
| $\vec{h}_m$ | field measured by the magnetometer |
| $z^{-1}$ | the delay operator, used in the diagrams to represent storing the "preceding image" |
| $g_{earth}$ | acceleration due to gravity (−9.80655 m/s² at sea level) |
| G | matrix associating the platform error $\tilde{\theta}$ with the acceleration projection errors $\Gamma = \begin{bmatrix} 0 & \gamma_V & -\gamma_E \\ -\gamma_V & 0 & \gamma_N \\ \gamma_E & -\gamma_N & 0 \end{bmatrix}$ |
| B | change of frame of reference matrix (transforming from the vehicle frame of reference to the magnetic geographical frame of reference) |

-continued

DEFINITION OF THE VARIABLES USED IN FIGS. 11 TO 18

$D_V$  matrix associating the error affecting the estimate of the airspeed vector with the error affecting the modulus of the airspeed (linear approximation for errors of small amplitude) $D_V = \frac{1}{\|V_{air}\|}[V_{airN} \ V_{airE} \ V_{airV}]$ H  matrix associating the platform error $\tilde{\theta}$ with the magnetic field projection errors $H = \begin{bmatrix} 0 & h_V & -h_E \\ -h_V & 0 & h_N \\ h_E & -h_N & 0 \end{bmatrix}$ K  matrix of the filter feedback gain or "Kalman gain"

Figure 11:
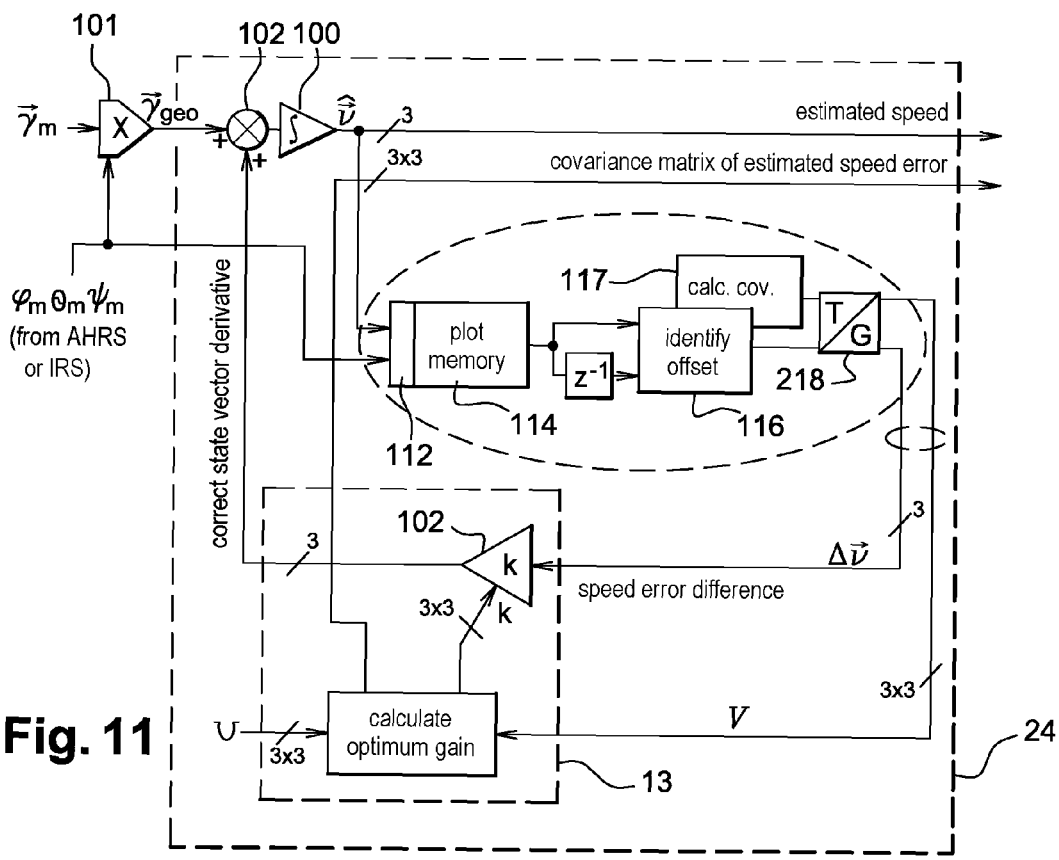
FIGS. 11 to 18 are block diagrams showing the organization of the main calculation means (reference 24, FIG. 1) for calculating a hybrid speed both from inertial measurements and from ground range measurements together, where appropriate, with additional measurements or observations.

A simple embodiment of the hybridization system is shown in FIG. 11.

In this form of the filter, an estimate of the speed is sustained by an integrator 100 integrating an acceleration measured in the geographical frame of reference. The acceleration vector $\vec{\gamma}_{geo}$ (i.e. its three components) is the sole inertial data coming from the IMU.

The subscript "geo" for the acceleration $\vec{\gamma}_{geo}$ indicates that it is expressed in a geographical frame of reference.

The attitude and heading angles $\phi_m$, $\theta_m$, $\psi_m$ needed for converting the plots (by a module 112 for converting frame of reference) prior to storing them in the image memory 114 come from an AHRS or from some other source available on board the aircraft.

The inertial sensor used is generally a strap-down system, which means that acceleration is measured in the carrier frame of reference. Projection into the geographical frame of reference is performed by a projection module 101.

In contrast, if the inertial sensor is a mechanical platform inertial navigation system (INS), then the y acceleration measurement is performed directly in the geographical frame of reference.

The hybridization device consists essentially in an integrator 100 associated with a feedback amplifier 102 of gain K. The transfer function of the filter is as follows:

$$\hat{\vec{v}} = \frac{1}{1+\tau p}\vec{v}_R + \frac{\tau p}{1+\tau p}\frac{\vec{\gamma}_{geom}}{p}$$

where:

$\tau=1/K$ is the time constant of the filter;

$\hat{\vec{v}}$ is the speed estimate (or hybrid speed);

$\vec{\gamma}_{geom}$ is the measured acceleration in the geographical frame of reference; and $\vec{v}_R$ is the raw speed observed by the lidar and the associated image processing.

The scheme shown in FIG. 11 does not show this "raw" speed explicitly, but the difference $(\hat{\vec{v}}-\vec{v}_R)$.

The expression for the transfer function shows the complementary nature of the filter; if the acceleration and speed measurements were perfect (i.e. not subject to error), then:

$$\hat{\vec{v}} = \frac{1}{1+\tau p}\vec{v} + \frac{\tau p}{1+\tau p}\frac{\vec{v}p}{p} = \frac{1+\tau p}{1+\tau p}\vec{v} = \vec{v}$$

(where $\vec{v}$ is the "true" speed).

The output from the filter would likewise be perfect. This is explained by the fact that if the "raw" speed input is subjected to lowpass filtering (thus enabling noise to be removed therefrom), adding the integrated acceleration input ($\gamma_{geom}/P$) that is subjected to highpass filtering with the same time constant exactly restores the portion that was lost by lowpass filtering (i.e. the dynamic or high frequency components). This complementary nature is independent of the value of the gain K or even of the structure of the feedback branch (i.e. of its transfer function).

The filter can be improved by adding to the feedback gain K an integral effect $K_i/p$ serving to estimate and compensate for any possible bias in acceleration measurement and/or by adding a device that calculates the feedback gain(s) (i.e. the proportional gain K and a possible integral gain $K_i$) in optimum manner at each instant in order to minimize the error on the hybrid speed.

Optimum gain is preferably calculated on the basis of an estimate of the amplitudes—or covariance matrices—of the noise affecting acceleration and speed (the principle of the Kalman filter).

These approaches are fruitful with acceleration being measured directly in the geographical frame of reference, i.e. using a mechanical platform INS for which the error can be modeled as the sum of Gaussian noise plus bias. Nevertheless, this type of equipment having a mechanical platform is old fashioned, and most present IMUs are of the strapdown type, performing their measurements in the carrier frame of reference.

With a strapdown IMU, the error concerning geographical acceleration can no longer be modeled as the sum of a bias plus Gaussian noise, since added thereto there are projection errors that are highly correlated with the flight profile, and thus not suitable for modeling in stochastic manner.

The preferred embodiment of the hybridization filter is thus based under such circumstances on sustaining a dedicated virtual platform (VPF) by integrating the IMU data (i.e. the three components of the acceleration vector $\vec{\gamma}_m$ and the three components of the angular speed vector $\vec{\omega}_m$), and on implementing a Kalman filter to hybridize the VPF on the observed speed obtained by processing the successive images delivered by the range finder, as described below.

Figure 12:
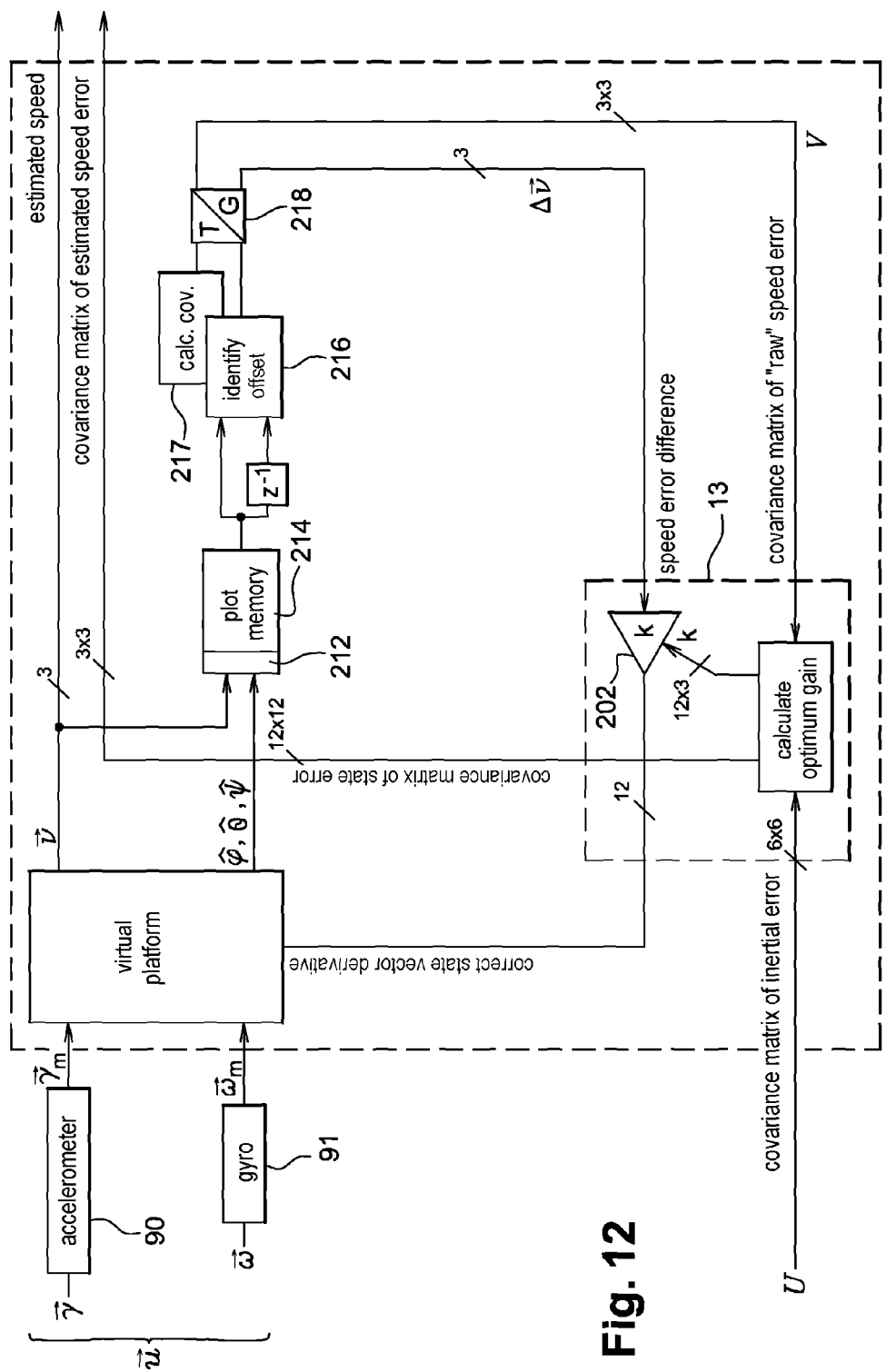
Figure 13:
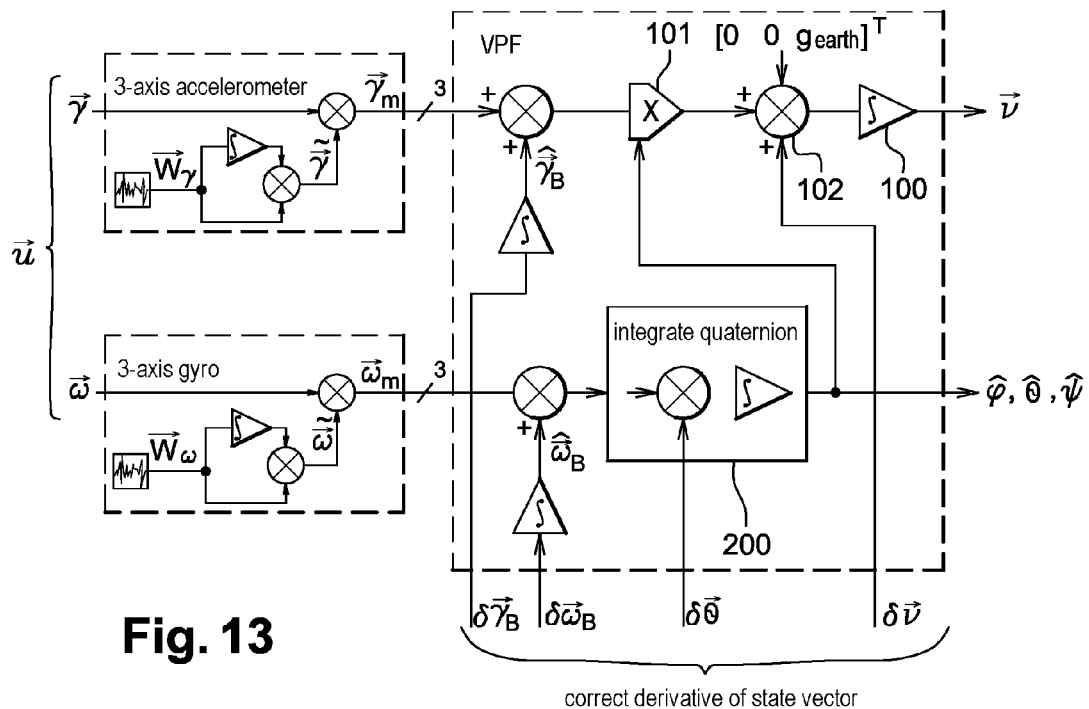
Figure 14:
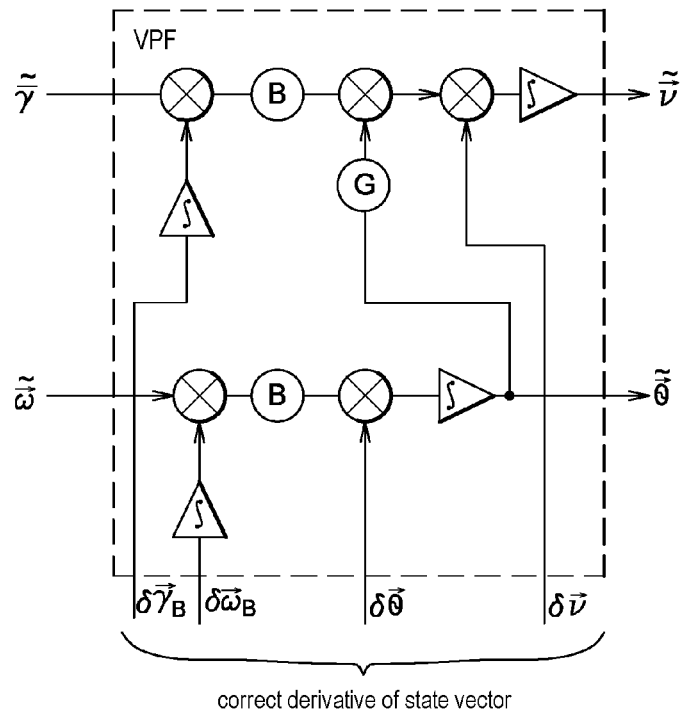

FIGS. 12 and 13 show the integration of a virtual platform from "strapdown" inertial measurements, and FIG. 14 shows error propagation in the virtual platform.

By integrating the angular speed measurements $\vec{\omega}_m$, an estimate is obtained of the angular position of the carrier (i.e. its "Euler" angles: heading; pitch; and roll). These three angular speed components measured using a strapdown system are not directly equal to the derivatives of the Euler angles, so the module 200 (FIG. 13) that performs this "integration" does not comprise three independent integrators, but makes use of quaternions in order to perform this operation.

Knowledge of the Euler angles makes it possible to project the acceleration measured in the vehicle frame of reference into the geographical frame of reference; subtracting terrestrial gravitation (by the operator 102) enables the speed derivative to be obtained; finally, integrating this derivative in the integrator 100 provides the hybrid speed $\hat{\vec{v}}$.

This simplified representation can be completed with account being taken of: i) the roundness of the earth, the speed estimate $\hat{\vec{v}}_{geo}$ can be used to calculate an angular speed correction term that has the effect of looping the two integrators and forming an oscillator of natural period equal to the so-called "Schuler" period (about 90 minutes); ii) the spherical nature of the geographical coordinate system where meridians converge on the poles, thereby leading to a term for rotation about the vertical axis of the geographical frame of reference when traveling east-west; and iii) the rotation of the earth.

Because of the integration processing applied to the angular speeds, the data processing performed by the VPF module is not a linear process. However, an examination of error propagation—and assuming that the errors applicable to the Euler angles are of small amplitude—shows that the error model (FIG. 14) is linear. In this diagram, G and B are the matrices defined in the above table.

In the calculation module shown in FIGS. 13 and 14 (VPF and associated 12-state error model):

2×3 integrators carry the estimated biases of the accelerometers and the gyros (six states);

quaternion integration is a non-linear process having three states (the three angles relating to roll, pitch, and heading);

the three speed components constitute three other states;

$\tilde{\theta}$ is the angular error of the platform (three small angles); and $\tilde{\theta} \wedge \vec{\gamma}_{geo} = G\tilde{\theta}$ is the error in acceleration projection.

The linearity of the error model shown in FIG. 14 lends itself well to implementing a Kalman filter in which inertial data is hybridized optimally with speed information coming from processing lidar data, as shown in FIG. 13.

The speed observation $\vec{v}_m$, coming from the range finder is in a geographical frame of reference. The image processing is described in the range-finder frame of reference. The processing of range-finder data making it possible to produce the raw speed measurement thus incorporates projection of the observed speed from the range-finder frame of reference to the geographical frame of reference; this operation is performed by a module 218 processing the data output by the modules 116 and 117. If the matrix M is the matrix for transforming from a frame of reference 1 to a frame of reference 2, then a vector known in the frame 1 is projected into the frame 2 by: $\vec{x}_2 = M\vec{x}_1$, and the matrix for the covariance of the error is given by $X_2 = M X_1 M^T$.

Although the aid (input) from the range finder can be used for observing only a portion of the state vector $\vec{x}$, the principle of the Kalman filter, based on an error propagation model, makes it possible to identify errors on all of the components of the state vector (providing that the carrier behaves dynamically in such a manner as to make it possible to observe errors in heading and horizontal acceleration). This means that the filter identifies not only speed errors, but also attitude errors and heading errors, as well as acceleration errors (or bias) and angular speed errors (or bias).

Figure 15:
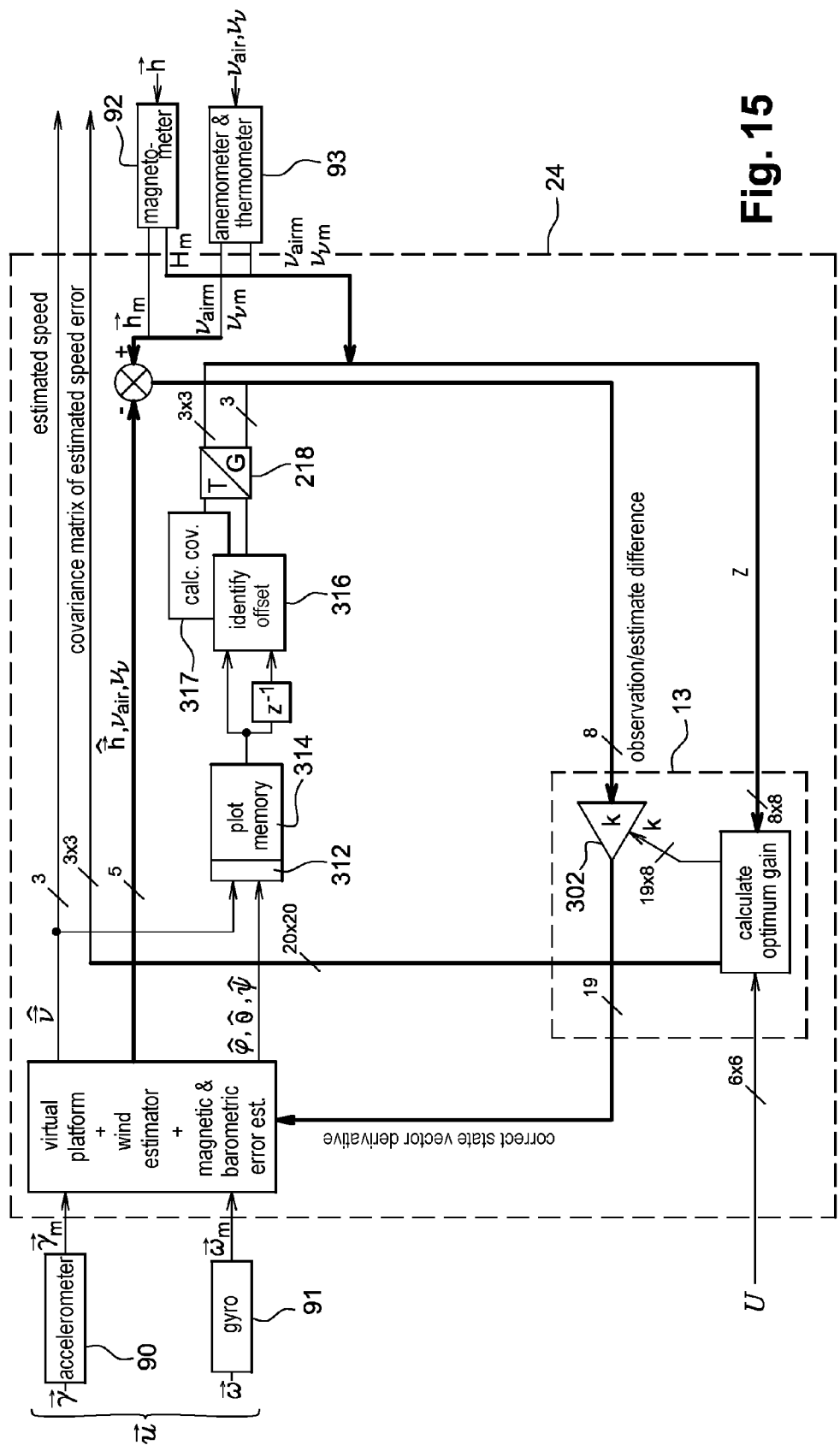
Figure 16:
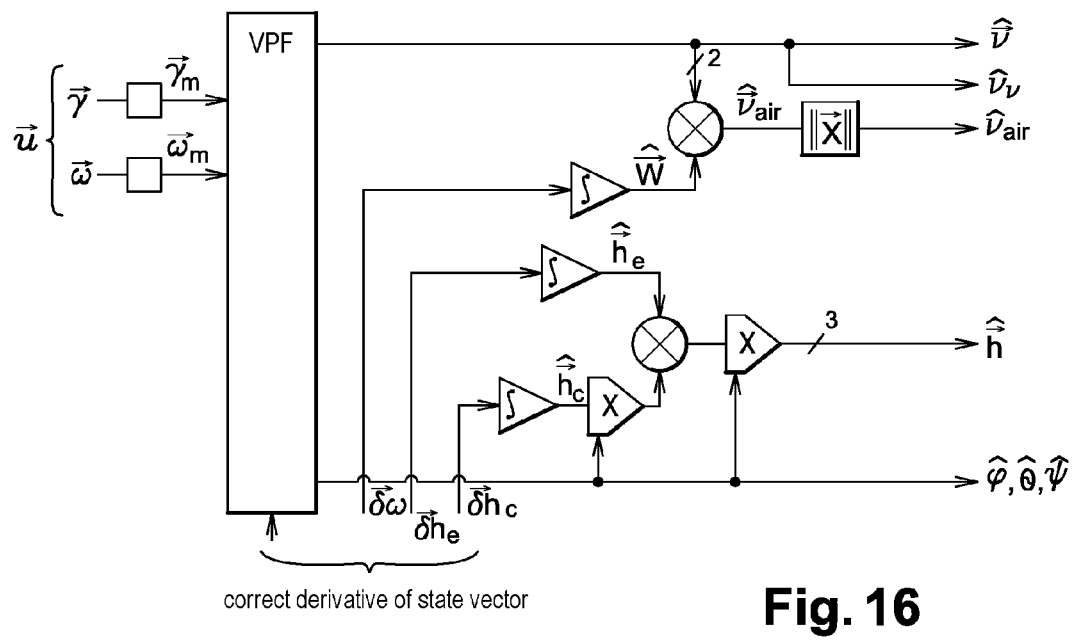
Figure 17:
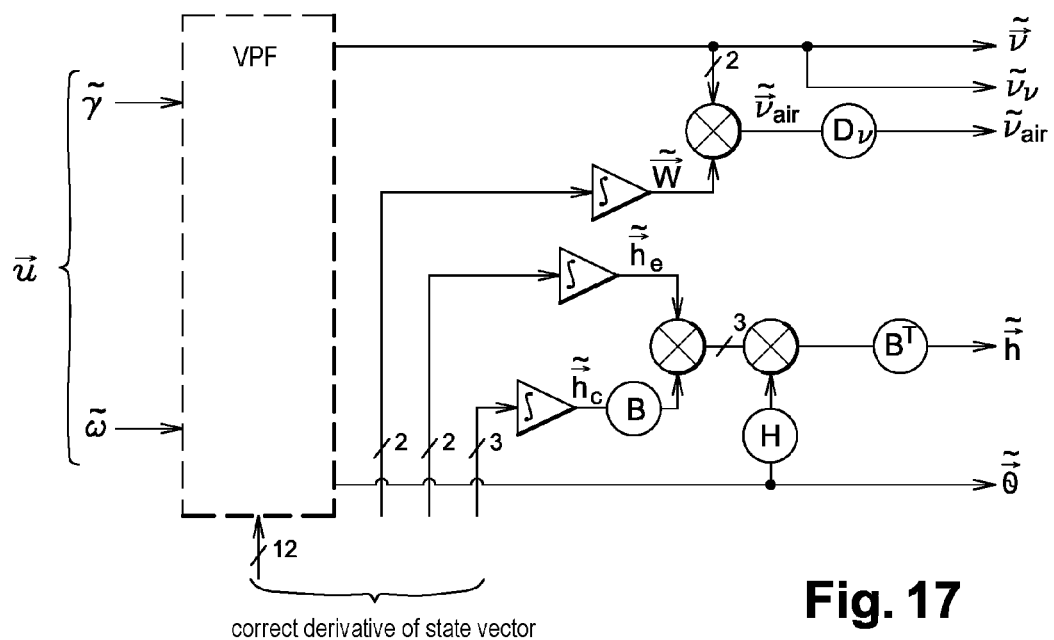

In the embodiment shown in FIGS. 15 to 17, a barometric altimeter is provided for providing assistance in estimating vertical speed; an airspeed sensor makes it possible to estimate wind speed during stages in which the range finder obtains echoes, and then to recalculate ground speed on the basis of the most recently estimated wind when the range finder no longer produces any echoes (e.g. because it is flying at high altitude). This air-speed aid serves to limit divergence of the ground speed estimate error during prolonged stages of lack of any SRF measurement. A magnetometer can provide assistance in estimating heading.

The virtual platform (FIG. 16) has six states (three Euler angles and three speed vector components), the inertial sensors having six Markov states (the three accelerometer biases and the three gyro biases); and the wind estimators and the magnetic and barometer measurements have seven states (see FIGS. 16 and 17); giving a complete state vector of dimension nineteen:

two integrators carry the north and east components of the wind, with the vertical component being assumed to be zero);

two integrators carry the north and vertical components of the estimated terrestrial magnetic field $\vec{h}_e$ in the geographical frame of reference (the east-west component is zero since work is carried out relative to magnetic north);

three integrators carry the estimate of the disturbing field $\vec{h}_c$ generated by the carrier in the carrier frame of reference; this field is projected into the geographical frame of reference;

the sum of the two preceding fields is projected back into the carrier frame of reference in order to form an estimate of the measured field;

the estimate of the airspeed $\hat{v}_{airm}$ is calculated as the modulus of the estimated airspeed vector: $\hat{v}_{airm} = \|\hat{\vec{v}}_{air}\|$; and the estimate of the vertical speed is simply the third component of the vector $\hat{\vec{v}}$.

The calculation of the error on the modulus is linearized as follows:

$$\|\hat{\vec{v}}_{air}\| = \sqrt{\hat{v}_{airN}^2 + \hat{v}_{airE}^2 + \hat{v}_{airD}^2}$$

$$\tilde{v}_{air} \underset{(\|\vec{v}_{air}\| small)}{\approx} \begin{bmatrix} \frac{\partial \|\vec{v}_{air}\|}{\partial v_{airN}} & \frac{\partial \|\vec{v}_{air}\|}{\partial v_{airE}} & \frac{\partial \|\vec{v}_{air}\|}{\partial v_{airD}} \end{bmatrix} \begin{bmatrix} \tilde{v}_{airN} \\ \tilde{v}_{airE} \\ \tilde{v}_{airD} \end{bmatrix} = D_v \tilde{\vec{v}}_{air}$$

with $D_v = \dfrac{[v_{airN} \ v_{airE} \ v_{airD}]}{\|\vec{v}_{air}\|}$

The error in the projection of the magnetic field is calculated as follows:

$\tilde{\theta} \wedge \vec{h}_{geo} = H\vec{\theta}$

Figure 18:
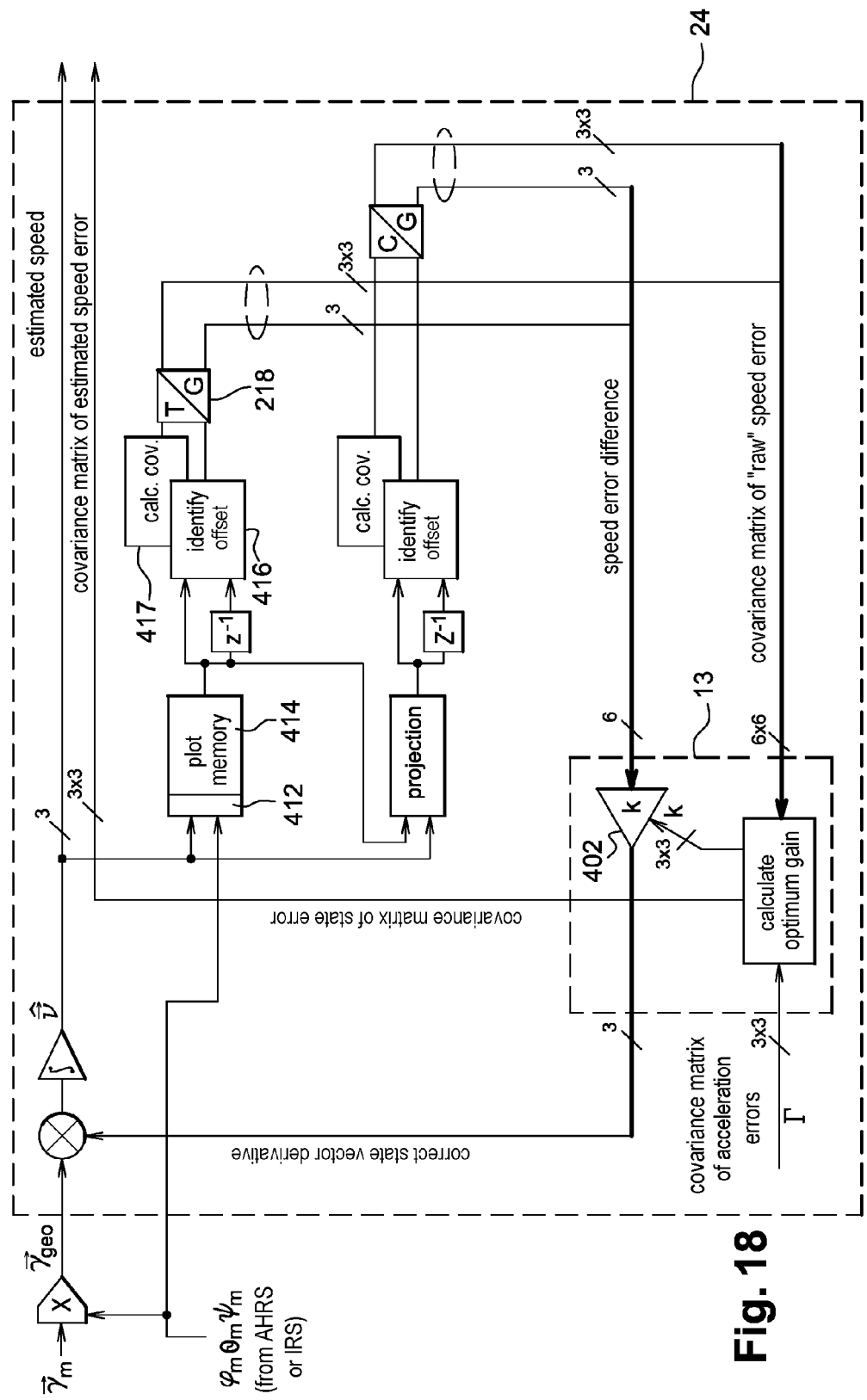

The hybridization system shown in FIG. 18 is similar to that of FIG. 11, and further includes means for determining the speed observed from a range finder and a plane imager (camera).

The observed speed $\vec{v}_{mc}$ (measured by the camera) coming from the combination of the data from the 2D imager and the range-finder data must also be in the geographical frame of reference on input to the Kalman filter. However, this observation is best in the camera frame of reference, given that only two components are available in this frame. To transform into the geographical frame, the vector can be associated with a third component that is arbitrarily set to zero, with this component being associated with infinite error variance. Changing the frame of reference of the vector and its covariance matrix is performed by the module 218 in the same manner as described above.

The diagram of FIG. 18 corresponds to the assumption whereby the acceleration measurement noise in the geographical frame of reference is white and centered. The virtual platform thus has three states (the three components of the speed vector). There are thus two available observations of speed, one coming from processing range-finder data and the other from processing 2D images associated with the range-finder data. The measurement is of dimension six (five of which dimensions are meaningful), and the matrix Z of the PSD of the errors affecting the two speed observation collectively is of dimension 6×6.

As in the embodiment of FIG. 11, the covariance matrix of the inertial measurement errors has the following form:

$$\begin{bmatrix} \Gamma_x & 0 & 0 \\ 0 & \Gamma_y & 0 \\ 0 & 0 & \Gamma_z \end{bmatrix}$$

Whereas in the embodiment corresponding to FIG. 11, the covariance matrix V of the errors in the sole observed speed has the form:

$$\begin{bmatrix} V_{nn_m} & V_{ne_m} & V_{nd_m} \\ V_{ne_m} & V_{ee_m} & V_{ed_m} \\ V_{nd_m} & V_{ed_m} & V_{dd_m} \end{bmatrix}$$

In the embodiment corresponding to FIG. 18, it takes the following form:

$$Z = \begin{bmatrix} \begin{bmatrix} V_{nn_{mt}} & V_{ne_{mt}} & V_{nd_{mt}} \\ V_{ne_{mt}} & V_{ee_{mt}} & V_{ed_{mt}} \\ V_{nd_{mt}} & V_{ed_{mt}} & V_{dd_{mt}} \end{bmatrix} & 0 \\ 0 & \begin{bmatrix} V_{nn_{mc}} & V_{ne_{mc}} & V_{nd_{mc}} \\ V_{ne_{mc}} & V_{ee_{mc}} & V_{ed_{mc}} \\ V_{nd_{mc}} & V_{ed_{mc}} & V_{dd_{mc}} \end{bmatrix} \end{bmatrix}$$

It should be observed that the various aids used in this embodiment are independent of the GPS and use thereof in the function of detecting obstacles does indeed satisfy the safety objective given to the devices of the invention.

The invention satisfies the requirements for independence between the operation of the OWS and the GPS. It thus satisfies the requirements of an all-weather helicopter that uses the GPS as its primary location means, and the OWS as its flight safety means.

Naturally, various additions, omissions, or modifications could be implemented by the person skilled in the art to the various embodiments described above, but in terms of structural elements and in terms of functional components, without that going beyond the ambit of the present invention.

What is claimed is:

1. A method of determining at least two components of the estimated speed vector ($\hat{v}$) of an aircraft relative to the ground (19), the method comprising the following steps:
   successively forming at least two images ($z_1(x,y)$, $z_2(x,y)$) of a single region of the ground, the images including distance data relating to the distance between the aircraft and points in the single region of the ground, the distance data corresponding to measurements delivered by a range finder;
   determining offsets ($\bar{d}$) between the images;
   determining a first raw or observed speed as a function of the offsets ($\bar{d}$) between the images;
   making inertial measurements of the movement of the aircraft; and
   combining the first raw or observed speed with the inertial measurements of the movement of the aircraft in order to determine the estimated speed vector($\hat{v}$).

2. A method according to claim 1, in which making the inertial measurements of the movement of the aircraft comprises measuring three acceleration components and three angular speed components of the movement of the aircraft.

3. A method according to claim 1, in which combining the first raw or observed speed with the inertial measurements of the movement of the aircraft comprises filtering the first raw or observed speed with the inertial measurements of the movement of the aircraft.

4. A method according to claim 3, comprising determining an a priori covariance matrix (V) for the error affecting the first raw or observed speed, and in which filtering is performed by a complementary filter (102, 202, 302, 402) having gains (K) that vary and depend on said covariance matrix.

5. A method according to claim 4, in which the complementary filter is a Kalman filter.

6. A method according to claim 1, in which the distance measurements come from a scanning range finder or from a snapshot range finder.

7. A method according to claim 1, in which the distance measurements are obtained by scanning the region of the ground.

8. A method according to claim 1, in which the images comprise light intensity data (I) of points of the observed region of the ground as delivered by at least one camera, the method further comprising determining a second raw or observed speed as a function of offsets between said images.

9. A method according to claim 8, in which measurements of airspeed of the aircraft are combined with the light intensity data.

10. A method according to claim 8, in which heading or magnetic field measurements are combined with the light intensity data.

11. A method according to claim 8, in which altitude or barometric pressure measurements are also combined with the light intensity data.

12. A method according to claim 1, in which determining the first raw or observed speed comprises implementing a differential method.

13. A method according to claim 1, in which determining the first raw or observed speed comprises implementing a method selected from the group consisting of a correlation method, a method based on energy, a method using parameterized models, or implementing a combination of said methods.

14. A method according to claim 1, in which measurements of airspeed of the aircraft are also combined with the inertial, or distance, measurements.

15. A method according to claim 1, in which heading or magnetic field measurements are also combined with the inertial or distance measurements.

16. A method according to claim 1, in which at least one of altitude and barometric pressure measurements is also combined with the inertial or distance measurements.

17. A system (18) for determining an estimated speed vector ($\hat{v}$) of an aircraft (25) including an inertial measurement unit (23) delivering inertial measurements relating to measured movement of the aircraft, the system further comprising:

distance measurement means (11) for measuring distances between the aircraft and points in a region of the ground (19);

means (16, 116, 216, 316, 416) for determining an observed or raw speed vector ($\vec{v}_R$) as a function of the distances delivered by the distance measurement means (11); and hybridization means (24) for combining the inertial measurements and the observed or raw speed vector ($\vec{v}_R$) and for delivering the estimated speed vector($\hat{\vec{v}}$), wherein the distance measurement means (11) is one of a lidar, a radar, and a sonar.

18. A system according to claim 17, in which the means (16, 116, 216, 316, 416) for determining an observed or raw speed vector produce a speed difference vector ($\hat{\vec{v}}-\vec{v}_R$), and in which the hybridization means (24) include filter means (13) for filtering said speed difference vector and the inertial measurements.

19. A system according to claim 18, in which the filter means (13) present gain (K) that is variable as a function of the covariances (V) of the errors affecting the distance measurements and also as a function of the covariances (U) of errors affecting the inertial measurements.

20. A system according to claim 17, in which the observed or raw speed vector is determined from an offset ($\vec{d}$) between two successive series of distance measurements, and from time interval ($\tau$) between said two series of observations of a single region of the ground.

21. A system according to claim 17, further comprising a barometric altimeter, a magnetometer (92), or an airspeed sensor (93), together with hybridization means for combining the measurements delivered by these sensors with the inertial and distance measurements.

22. A system according to claim 17, further including at least one passive observation sensor such as an infrared camera, and means for determining a second observed speed from images delivered by said sensor and from the distance measurements, in order to mitigate stages during which it is not possible to estimate raw or observed speed from distance measurements only.

23. A system according to claim 17, that is independent of a satellite positioning system.

24. A method of detecting obstacles while on board an aircraft, the method comprising the following operations:

extracting an observed or raw speed vector ($\vec{v}_R$) for the aircraft from at least one sequence of images of a region overflown by the aircraft, the images being delivered by an observation sensor (11) installed on board the aircraft, each image comprising information including relative three-dimensional positions for the aircraft and a plurality of points of the region;

obtaining echoes of the region from an on-board range finder;

hybridizing the observed or raw speed vector with speed delivered by an on-board inertial sensor to obtain a hybrid speed; and detecting obstacles from the echoes and from the hybrid speed.

25. The method of claim 24, wherein the aircraft is a rotary wing aircraft.

* * * * *